US010951471B2

(12) United States Patent
Yen et al.

(10) Patent No.: US 10,951,471 B2
(45) Date of Patent: Mar. 16, 2021

(54) MECHANISM FOR HARDWARE CONFIGURATION AND SOFTWARE DEPLOYMENT

(71) Applicant: QUANTA CLOUD TECHNOLOGY INC., Taipei (TW)

(72) Inventors: Chi Yuan Yen, Taipei (TW); Mu-Han Huang, Taipei (TW)

(73) Assignee: QUANTA CLOUD TECHNOLOGY INC., Taipei (TW)

( * ) Notice: Subject to any disclaimer, the term of this patent is extended or adjusted under 35 U.S.C. 154(b) by 85 days.

(21) Appl. No.: 16/034,939

(22) Filed: Jul. 13, 2018

(65) Prior Publication Data

US 2019/0020540 A1  Jan. 17, 2019

Related U.S. Application Data

(60) Provisional application No. 62/532,748, filed on Jul. 14, 2017.

(51) Int. Cl.
*H04L 12/24* (2006.01)
*G06F 9/445* (2018.01)
(Continued)

(52) U.S. Cl.
CPC ........ *H04L 41/0809* (2013.01); *G06F 9/4416* (2013.01); *G06F 9/44505* (2013.01); *H04L 41/0876* (2013.01); *H04L 41/0886* (2013.01); *H04L 41/0893* (2013.01); *H04L 67/34* (2013.01); *G06F 3/0482* (2013.01); *G06F 3/04842* (2013.01); *H04L 41/12* (2013.01); *H04L 41/16* (2013.01); *H04L 43/50* (2013.01)

(58) Field of Classification Search
CPC ............. H04L 41/0886; H04L 41/0876; H04L 41/0893; H04L 67/34; H04L 41/0809; H04L 41/16; H04L 43/50; H04L 41/12; H04L 41/0806; H04L 41/0869; H04L 41/28; H04L 49/65; G06F 9/4416; G06F 9/44505; G06F 3/04842; G06F 3/0482; G06F 9/4408; G06F 9/4406; G06F 11/1417; G06F 8/63; G06F 9/4401; G06F 9/445

See application file for complete search history.

(56) References Cited

U.S. PATENT DOCUMENTS 6,539,473 B1 * 3/2003 Hubacher ............. G06F 9/4416
  709/203
6,754,818 B1 * 6/2004 Lee ....................... G06F 9/4406
  713/1

(Continued)

OTHER PUBLICATIONS

IEEE 100, The Authoritative Dictionary of IEEE Standards Terms, 2000, IEEE, Seventh Edition, p. 1031. (Year: 2000).*

*Primary Examiner* — Muhammad Raza
(74) *Attorney, Agent, or Firm* — Nixon Peabody LLP

(57) ABSTRACT

A plug-and-play solution deployment mechanism and infrastructure to automate deployment of network cluster devices is disclosed. The solution includes an agile hardware topology discovery mechanism to automatically map the hardware of the cluster devices. The solution includes an intelligent engine for recognition of BIOS configuration setting and BIOS configuration of the devices. The solution also includes a demand-driven Cloud architecture design engine to design and test a cloud architecture incorporating the cluster devices.

10 Claims, 34 Drawing Sheets

(51) Int. Cl.
  *H04L 29/08*   (2006.01)
  *G06F 9/4401*  (2018.01)
  *G06F 3/0484*  (2013.01)
  *G06F 3/0482*  (2013.01)
  *H04L 12/26*   (2006.01)

(56) References Cited

U.S. PATENT DOCUMENTS

| | | | |
|---|---|---|---|
| 2006/0282652 A1* | 12/2006 | El-Haj-mahmoud | ........................ G06F 9/4408 713/1 |
| 2011/0225274 A1* | 9/2011 | Dvorkin | .............. G06F 9/44505 709/222 |
| 2013/0290694 A1* | 10/2013 | Civilini | .............. H04L 41/0806 713/2 |
| 2014/0201515 A1* | 7/2014 | Weber | .................. G06F 9/4401 713/2 |

* cited by examiner

```
nodes:
    - mac: 2C:60:0C:BC:30:C1
      name: node13
      bmc_user: admin
      bmc_password: admin
      bmc_addr: 10.102.61.13
      capabilities: controller
    - mac: 2C:60:0C:BC:27:B1
      name: node14
      bmc_user: admin
      bmc_password: admin
      bmc_addr: 10.102.61.14
      capabilities: cephstorage
    - mac: 2C:60:0C:BC:2F:E3
      name: node15
      bmc_user: admin
      bmc_password: admin
      bmc_addr: 10.102.61.15
      capabilities: compute
```

FIG. 1B

| nic | id |
|---|---|
|  | mac |
|  | type |
|  | name |
|  | ip |
|  | netmask |
|  | gateway |
|  | dns |
|  | dhcp_ip |
|  | cardtype |
|  | slot_id |
|  | lanport_id |
|  | node_id |
|  | port_id |
|  | numa_id |
|  | phy_loc |
|  | bios_dev_name |

FIG. 4D

```
1 | a8:1e:84:a1:20:76 | bmc | | | | | | 10.102.50.28 | | | | 1 | 1 | | |
2 | a8:1e:84:a1:1e:66 | bmc | | | | | | 10.102.50.23 | | | | 2 | 2 | | |
3 | a8:1e:84:a1:1d:f4 | bmc | | | | | | 10.102.50.22 | | | | 3 | 3 | | |
4 | a8:1e:84:a1:1d:4a | bmc | | | | | | 10.102.50.21 | | | | 4 | 4 | | |
5 | a8:1e:84:a1:1c:69 | bmc | | | | | | 10.102.50.20 | | | | 5 | 5 | | |
6 | a8:1e:84:a1:1c:82 | bmc | | | | | | 10.102.50.19 | | | | 6 | 6 | | |
7 | a8:1e:84:a1:1d:ae | bmc | | | | | | 10.102.50.18 | | | | 7 | 7 | | |
8 | a8:1e:84:a1:1d:7c | bmc | | | | | | 10.102.50.17 | | | | 8 | 8 | | |
9 | 54:ab:3a:36:49:1b | bmc | | | | | | 10.102.50.16 | | | | 9 | 9 | | |
10 | 54:ab:3a:36:48:70 | bmc | | | | | | 10.102.50.15 | | | | 10 | 10 | | |
11 | 54:ab:3a:36:48:9a | bmc | | | | | | 10.102.50.14 | | | | 11 | 11 | | |
```

FIG. 4E

```
1 | a8:1e:84:a1:20:76 | bmc | | 172.16.0.11 | 255.255.255.0 | 172.16.0.1 | |
2 | a8:1e:84:a1:1e:66 | bmc | | 172.16.0.12 | 255.255.255.0 | 172.16.0.1 | |
3 | a8:1e:84:a1:1d:f4 | bmc | | 172.16.0.13 | 255.255.255.0 | 172.16.0.1 | |
4 | a8:1e:84:a1:1d:4a | bmc | | 172.16.0.14 | 255.255.255.0 | 172.16.0.1 | |
5 | a8:1e:84:a1:1c:69 | bmc | | 172.16.0.15 | 255.255.255.0 | 172.16.0.1 | |
6 | a8:1e:84:a1:1c:82 | bmc | | 172.16.0.16 | 255.255.255.0 | 172.16.0.1 | |
7 | a8:1e:84:a1:1d:ae | bmc | | 172.16.0.17 | 255.255.255.0 | 172.16.0.1 | |
8 | a8:1e:84:a1:1d:7c | bmc | | 172.16.0.18 | 255.255.255.0 | 172.16.0.1 | |
9 | 54:ab:3a:36:49:1b | bmc | | 172.16.0.19 | 255.255.255.0 | 172.16.0.1 | |
10 | 54:ab:3a:36:48:70 | bmc | | 172.16.0.20 | 255.255.255.0 | 172.16.0.1 |
11 | 54:ab:3a:36:48:9a | bmc | | 172.16.0.21 | 255.255.255.0 | 172.16.0.1 |
```

```
sqlite> select * from nic where node_id=12 order by node_id:
11 | 54:ab: 3a:36:48:9a | bmc | | 172.16.0.21 | 255.255.255.0 | 172.16.0.1 | | 10.102.50.14 | | | | | 12 | 11 | | |
240 | 3c:fd: fe:a8:5f:1c | system | | | | | | | pcie | 49 | 0 | 12 | | | | | Riser3 Slot0 | enp175s0f0
241 | 3c:fd: fe:a8:5f:1d | system | | | | | | | pcie | 49 | 1 | 12 | | | | | Riser3 Slot0 | enp175s0f1
242 | 3c:fd: fe:a7:ff:f8 | system | | | | | | | pcie | 50 | 0 | 12 | | | | | Riser3 Slot1 | enp218s0f0
243 | 3c:fd: fe:a7:ff:f9 | system | | | | | | | pcie | 50 | 1 | 12 | | | | | Riser3 Slot1 | enp218s0f1
244 | 3c:fd: fe:a8:5e:e4 | system | | | | | | | pcie | 19 | 0 | 12 | | 0 | Riser1 Slot | enp28s0f0
245 | 3c:fd: fe:a8:5e:e5 | system | | | | | | | pcie | 19 | 1 | 12 | | 0 | Riser1 Slot | enp28s0f1
246 | 68:05: ca:3f:39:5a | system | | | | | | | ocp | 17 | 0 | 12 | | 0 | OCP Mezz Conn | enp59s0 sqlite> select * from port where id=11;
11|1|1|
sqlite> select * from switch where id=1;
1 | | 10.102.50.5 | management
```

FIG. 4G

```
1. root@deployer:/dev/shm (ssh)
Searching for value [ QLogic MBA Slot 1801 ]
loop sequence: 1
loop sequence: 2
Switch to value [ QLogic MBA Slot 1801 ]
loop sequence: 4
Switch to item [ Boot Option #1 ]
Searching for value [ QLogic MBA Slot 8601 ]
loop sequence: 1

[0] 0 : root@deployer:/dev/shm*                          "deployer" 01:39 02-Mar-18
```

FIG. 7D

```
PLAY [Overcloud deployment - Step 2/2 Deployment] *************************************************

TASK [setup] **********************************************************************************
ok: [undercloud]

TASK [overcloud/deploy : Prepare directory for heat-templates] ********************
changed: [undercloud]

TASK [overcloud/deploy : Prepare heat-templates for local use] ********************
changed: [undercloud]

TASK [overcloud/deploy : Prepare storage environment file] ************************
changed: [undercloud]

TASK [overcloud/deploy : Prepare network environment file] ************************
changed: [undercloud]

TASK [overcloud/deploy : Prepare directory - network-environment] *****************
changed: [undercloud]

TASK [overcloud/deploy : Prepare NIC card configuration file - controller] ********
changed: [undercloud]

TASK [overcloud/deploy : Prepare NIC card configuration file - compute] ***********
changed: [undercloud]

TASK [overcloud/deploy : Prepare NIC card configuration file - ceph] **************
changed: [undercloud]

TASK [overcloud/deploy : Prepare userdata file for customization - firstboot script] ***
```

FIG. 10A

```
2017-04-28 01:18:58Z [overcloud.CephStorage.2.NodeUserData]: CREATE_IN_PROGRESS  state changed
2017-04-28 01:18:58Z [overcloud.BlockStorageIpListMap]: CREATE_COMPLETE  state changed
2017-04-28 01:18:58Z [overcloud.Controller.1.UserData]: CREATE_COMPLETE  state changed
2017-04-28 01:18:59Z [overcloud.Controller.2.UpdateConfig]: CREATE_COMPLETE  state changed
2017-04-28 01:18:59Z [overcloud.ObjectStorageIpListMap]: CREATE_COMPLETE  state changed
2017-04-28 01:18:59Z [overcloud.CephStorage.2.NodeAdminUserData]: CREATE_IN_PROGRESS  state changed
2017-04-28 01:18:59Z [overcloud.Controller.2.NodeAdminUserData]: CREATE_COMPLETE  state changed
2017-04-28 01:18:59Z [overcloud.Controller.1.Controller]: CREATE_IN_PROGRESS  state changed
2017-04-28 01:18:59Z [overcloud.CephStorage.2.UpdateConfig]: CREATE_COMPLETE  state changed
2017-04-28 01:18:59Z [overcloud.CephStorage.0.NodeUserData]: CREATE_COMPLETE  state changed
2017-04-28 01:18:59Z [overcloud.Controller.0.UserData]: CREATE_IN_PROGRESS  state changed
2017-04-28 01:18:59Z [overcloud.CephStorage.1.UserData]: CREATE_COMPLETE  state changed
2017-04-28 01:18:59Z [overcloud.CephStorage.0.UpdateConfig]: CREATE_COMPLETE  state changed
2017-04-28 01:18:59Z [overcloud.CephStorage.0.NodeUserData]: CREATE_COMPLETE  state changed
2017-04-28 01:18:59Z [overcloud.CephStorage.1.CephStorage]: CREATE_IN_PROGRESS  state changed
2017-04-28 01:19:00Z [overcloud.Controller.2.NodeUserData]: CREATE_COMPLETE  state changed
2017-04-28 01:19:00Z [overcloud.Controller.2.UserData]: CREATE_IN_PROGRESS  state changed
2017-04-28 01:19:00Z [overcloud.CephStorage.0.NodeAdminUserData]: CREATE_COMPLETE  state changed
2017-04-28 01:19:01Z [overcloud.Controller.0.UserData]: CREATE_COMPLETE  state changed
2017-04-28 01:19:01Z [overcloud.CephStorage.0.UserData]: CREATE_IN_PROGRESS  state changed
2017-04-28 01:19:01Z [overcloud.Controller.2.UserData]: CREATE_COMPLETE  state changed
2017-04-28 01:19:01Z [overcloud.CephStorage.2.NodeUserData]: CREATE_COMPLETE  state changed
2017-04-28 01:19:01Z [overcloud.Controller.2.NodeAdminUserData]: CREATE_COMPLETE  state changed
2017-04-28 01:19:01Z [overcloud.CephStorage.2.UserData]: CREATE_COMPLETE  state changed
2017-04-28 01:19:01Z [overcloud.Controller.0.Controller]: CREATE_IN_PROGRESS  state changed
2017-04-28 01:19:02Z [overcloud.CephStorage.2.UserData]: CREATE_IN_PROGRESS  state changed
2017-04-28 01:19:02Z [overcloud.Controller.2.Controller]: CREATE_IN_PROGRESS  state changed
2017-04-28 01:19:02Z [overcloud.CephStorage.0.UserData]: CREATE_COMPLETE  state changed
2017-04-28 01:19:02Z [overcloud.CephStorage.0.CephStorage]: CREATE_IN_PROGRESS  state changed
2017-04-28 01:19:02Z [overcloud.CephStorage.2.UserData]: CREATE_COMPLETE  state changed
2017-04-28 01:19:03Z [overcloud.CephStorage.2.CephStorage]: CREATE_IN_PROGRESS  state changed
```

FIG. 10B

Confirm Settings

◉ *General Information* 〉 ○ Switch Configuration 〉 ○ Director and Control Plane Network 〉 ○ Overcloud Configuration  ← 1100

Switch Configuration ← 1110

| 1 | 3 | 5 | 7 | 9 | 11 | 13 | 15 | 17 | 19 | 21 | 23 | 25 | 27 | 29 | 31 | 33 | 35 | 37 | 39 | 41 | 43 | 45 | 47 |
|---|---|---|---|---|---|---|---|---|---|---|---|---|---|---|---|---|---|---|---|---|---|---|---|
| 2 | 4 | 6 | 8 | 10 | 12 | 14 | 16 | 18 | 20 | 22 | 24 | 26 | 28 | 30 | 32 | 34 | 36 | 38 | 40 | 42 | 44 | 46 | 48 |

1112 — Click port to get port information — 1114, 1116, 1102, 1140

◌ Infra  ◍ Controller  ◍ Compute  ◌ Storage ← 1144

| Port# ⇅ | BMC IP | BMC Netmask | BMC Gateway | Role |
|---|---|---|---|---|
| 1 | 10.102.50.11 | 255.255.255.0 | 10.102.50.1 | infra |
| 2 | 10.102.50.12 | 255.255.255.0 | 10.102.50.1 | controller |
| 3 | 10.102.50.13 | 255.255.255.0 | 10.102.50.1 | controller |
| 4 | 10.102.50.14 | 255.255.255.0 | 10.102.50.1 | controller |
| 5 | 10.102.50.15 | 255.255.255.0 | 10.102.50.1 | dpdkcompute |
| 6 | 10.102.50.16 | 255.255.255.0 | 10.102.50.1 | dpdkcompute |
| 7 | 10.102.50.17 | 255.255.255.0 | 10.102.50.1 | sriovcompute |
| 8 | 10.102.50.18 | 255.255.255.0 | 10.102.50.1 | sriovcompute |

1142, 1146

[ Back ]  [ Confirm & Next ] ← 1118

FIG. 11B

MECHANISM FOR HARDWARE CONFIGURATION AND SOFTWARE DEPLOYMENT

PRIORITY CLAIM

The present disclosure claims priority to U.S. Provisional Ser. No. 62/532,748, filed on Jul. 14, 2017. The contents of that application are hereby incorporated by reference in their entirety.

TECHNICAL FIELD

The present disclosure relates generally to efficient electronic device and network provisioning. More particularly, aspects of this disclosure relate to automation of provisioning devices to set up clustered devices.

BACKGROUND

The emergence of the cloud for computing applications has increased the demand for off-site installations, known as data centers, that store data and run applications accessed by remotely connected computer device users. Such data centers typically have massive numbers of servers, switches, and storage devices to store and manage data. A typical data center has physical rack structures with attendant power and communication connections. The racks are arranged in rows throughout the room, or rooms, of the data center. Each rack may hold multiple devices such as servers, switches, and storage devices. As different functions are requested by operators of data centers, specialized servers are required. Such specialized servers may include a storage server, a computing server, a graphic processing unit server, or a network switch server. Connecting each of the servers in the rack to switching devices for communication is time consuming. Further, each type of server in a network for a data center requires different setups of hardware and software.

Each type of device must be installed in a rack or cluster that may have a variety of desired nodes, such as computer servers, controller servers, and storage servers, for example. The management and data switches that connect all the nodes in a rack must be connected and properly configured so each node may communicate data to each other. The individual operating systems on each rack node must also be configured, and any specialized software must be installed. Finally, the connections and functions of the nodes must be validated. Thus, setup of a rack or cluster of nodes for a data center is often a time consuming and manually intensive endeavor.

The traditional deployment method for preparing a cluster of nodes for operation is considerably complicated. A large amount of manual tasks is required prior to the deployment process. For example, switch configuration, hardware information collection, and BIOS setup must be performed by technicians for each network and node in the cluster. Further, solution prerequisites and configurations need to be defined for each network and node after hardware information is collected manually. After deployment, several validation tests need to be manually executed on the deployed solution for a functional check of the solution.

One example of the complexity relates to composing systems to operate under a Cloud infrastructure. Operators are looking for ways to construct their cloud infrastructure correctly to prevent costly repairs and trouble shooting. However, to precisely compose a system for OpenStack cloud environment is not feasible due to the lack of collecting hardware topology, especially on non-uniform memory access (NUMA) balanced design hardware. Operators always encounter difficulties in identifying hardware component allocation in current introspection processes provided by Ironic or Maas, which does not include hardware topology information. Lack of hardware topology information during installation will cause certain problems. For example, it is often difficult to identify the connection between the network interface cards (NIC)s and the corresponding slots when user installs more than one MC card to a system.

Another complicated issue is adjusting BIOS configuration setting during installation. Traditionally, to alter a BIOS setting, users need to apply a BIOS change through either baseboard management controller (BMC) console redirection, or physically go on-site and have a keyboard and monitor connected to a server for examination of the BIOS settings. Such procedures are time consuming and inefficient.

Another issue is the challenge of planning and designing an OpenStack cloud architecture. Such architecture is always challenging and requires deep understanding of OpenStack services, user requirements, and detailed hardware design. Administrators currently spend a lot of time digging into OpenStack services, deciding which machine model to use, and learning how to select all of the configurations based on the hardware layout. Currently some open-source projects have attempted to implement automation aimed at facilitating the OpenStack cloud deployment. However, such projects only focus on the software deployment part of OpenStack cloud deployment.

As demonstrated by the examples above, current solution deployment for networked devices is a time-consuming job and may result in numerous human errors. Thus, there a need for a streamlined process to allow for composition of systems for network based operation. There is a further need for a flexible BIOS configuration mechanism to allow for automatic adjustment of BIOS settings for networked devices. There is also a need for a system for efficient planning of an OpenStack cloud server network.

SUMMARY

One disclosed example is a method for configuring the basic input output system (BIOS) of nodes in a networked cluster. A connection is established between a deployment server and each of the nodes. The deployment server is operable to access a plurality of stored different options for BIOS configurations. At least one of the accessible BIOS options is selected for at least one BIOS configuration for each of the nodes via an intelligent engine based on a predefined rule. The BIOS for each of the nodes is configured according to the selected BIOS option.

Another disclosed example is a system to automatically configure the basic input output system (BIOS) of nodes in a networked cluster. The system includes a deployment server connected via the network to each of the nodes in the cluster. A BIOS configuration file includes a plurality of stored accessible options for BIOS configurations. An intelligent engine is operable to select at least one of the accessible BIOS options for at least one BIOS configuration for each of the nodes, via an intelligent engine based on a predefined rule. The intelligent engine configures the BIOS for each of the nodes according to the selected BIOS option.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 1B is a screen image of an example solution configuration file;

FIG. 4D is an example database NIC table schema for BMC IP assignment;

FIG. 4E is a screen image of a MAC address table dump;

FIG. 4F is a screen image of a 4.f mapping table;

FIG. 4G is a screen image of collected hardware topology data from one example node;

FIG. 7A-7D are screen images of the menus for configuring a BIOS for a networked node;

FIG. 10A is a screen image of a back end log for the deployment of network configurations;

FIG. 10B is a screen image of a back end log for an Ansible playbook for solution deployment;

FIGS. 11A-11E are screen images of user displays to display configuration information for a network of devices;

Figure 1A:
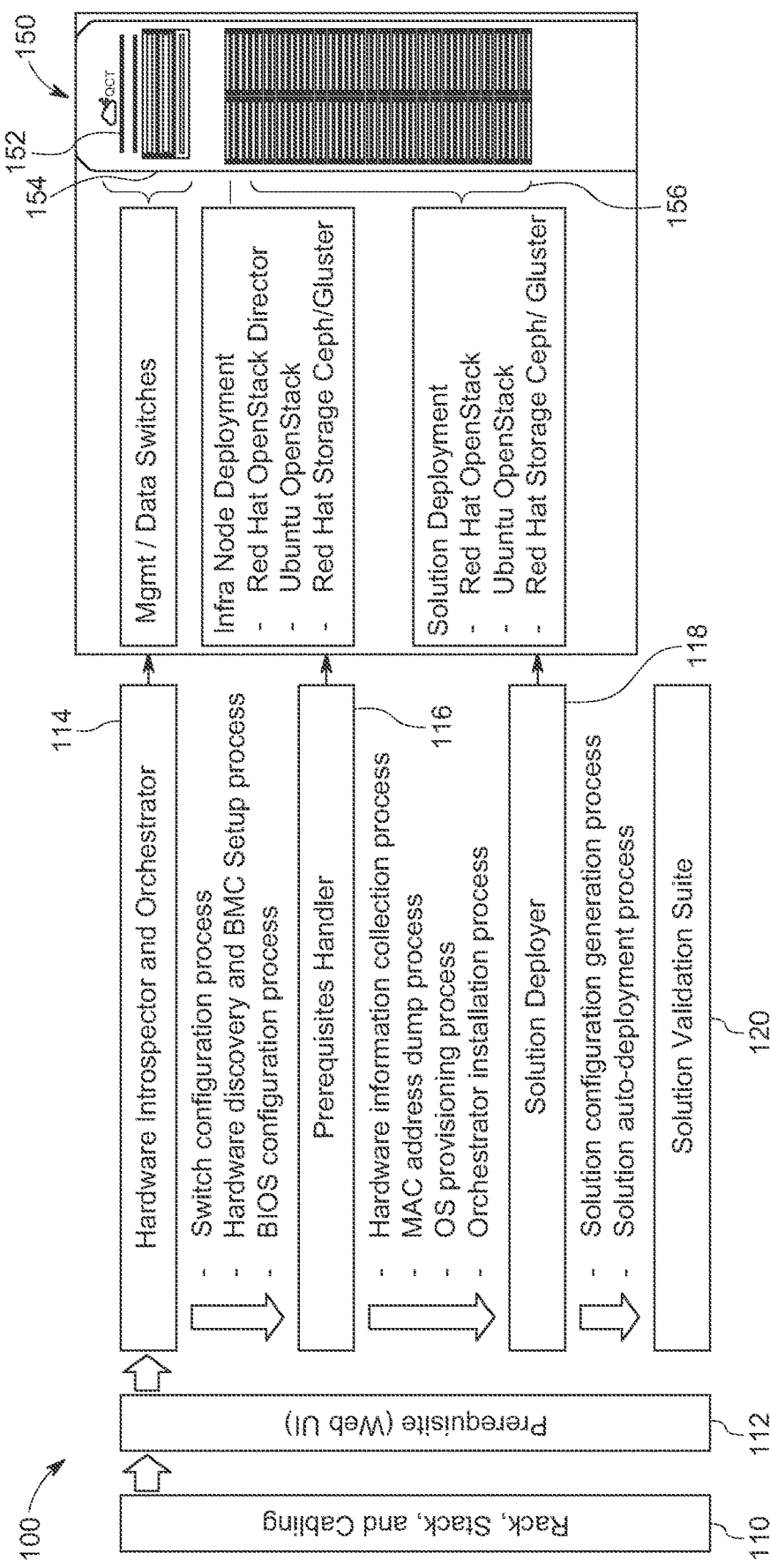
FIG. 1A is a block diagram showing the process of automatic configuration of a cluster or rack of devices.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The below described systems and methods are centered around a plug-and-play solution deployment mechanism and infrastructure to automate deployment of network cluster devices in environments such as OpenStack architecture. FIG. 1A shows a process 100 of setting up a network of devices for a rack or cluster system 150. The desired devices are installed in the rack 150 in the desired order and cables are attached (110). A web interface is generated for selected prerequisites to provisioning the environment by a deployment server (112). As will be described below, the process is centered around a plug and play manager for provisioning a network of devices. The plug-and-play manager includes three modules in this example: (a) an "Agile Hardware Topology Discovery Mechanism" module; (b) an "Intelligent Recognition for BIOS Configuration Setting" module; and (c) a "Demand-driven Cloud Architecture Design Engine" module.

As shown in FIG. 1A, after hardware preparation, the plug-and-play manager initiates the switch configuration process, automatically discovers hardware, and launches the BIOS configuration process via a hardware orchestrator module (114). The management switch and data switches for a rack are thus configured. Subsequently, a prerequisites handler 116 starts to collect hardware information, and a media access control (MAC) address dump process is executed to retrieve data based on solution requirements. Meanwhile, an OS provisioning process and an orchestrator installation process are implemented in this stage. The plug-and-play manager initiates the solution configuration generation process via a solution deployment module 118 to compile environment templates for deployment. Finally, the deployment and validation process is automatically launched (120).

Thus, the process 100 is directed toward set up and testing of devices in the rack system 150. The rack system 150 includes at least one management switch 152 and at least one data switch 154. As shown in FIG. 1A, the hardware orchestrator 114 provides configuration of the switches 152 and 154. The rack system 150 also includes a series of nodes 156, which may be computing servers, storage servers, or controller servers. The solution deployment module 118 provides configuration of the nodes 156.

Figure 2:
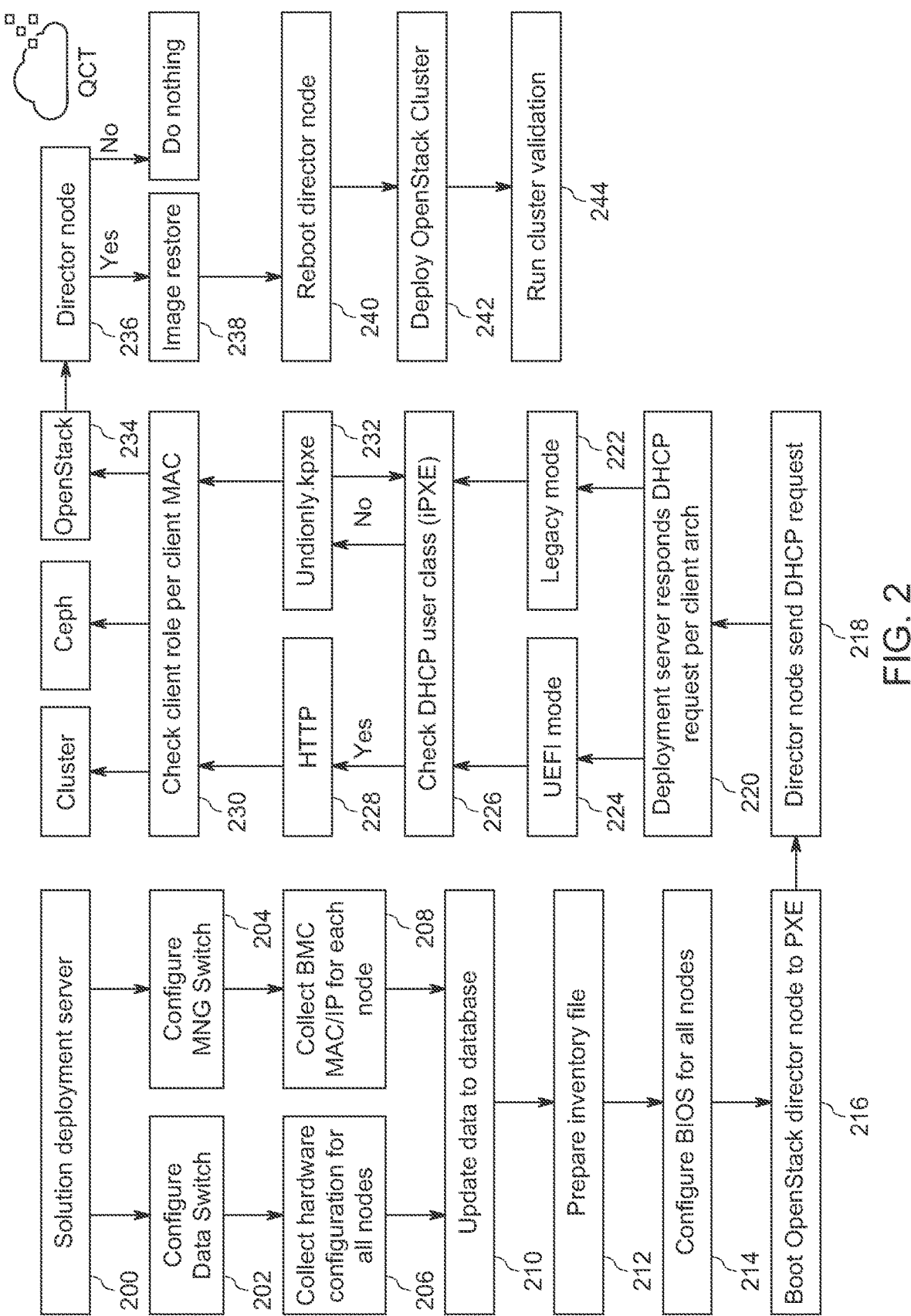
FIG. 2 is a flow diagram of the deployment of solutions to automatically configure a solution.

FIG. 2 shows a flow diagram for the topology discovery process executed by a solution deployment server 200. In this example, the solution deployment server 200 may execute the plug-and-play manager that incorporates the "Agile Hardware Topology Discovery Mechanism, the "Intelligent Recognition for BIOS Configuration Setting" and the "Demand-driven Cloud Architecture Design Engine" modules Of course other devices may perform these functions as directed by the plug-and-play manager.

A first stage is performed by the "Agile Hardware Topology Discovery Mechanism" module to assist a user to discover the NUMA hardware topology. The plug-and-play manager hosts a DHCP service for the baseboard management controller (BMC) and network interface of solution nodes on the devices in the rack. The service populates a database with the BMC addresses and MAC addresses for each node. The program imports a solution profile to the system. A solution profile is a set of data for configuring the solution based on customer demand and information from the database. For example, a solution profile for an OpenStack solution deployment may contain the total number of nodes; network IP subnets and VLANs for each network; and the storage environment settings, including identifying which disk to store data. FIG. 1B shows a screen image of an example yaml file that includes MAC address, node name, BMC address and node capability for each node. The yaml file in FIG. 1B is the set of data prepared based on customer specification obtained via a survey and data obtained via a script that parses and filters the database entries relating to MAC addresses and BMC addresses.

The plug-and-play manager loads a switch profile to the data switches (202) and the management switches (204) through a COM port. The switch profile contains data such as IP, VLAN, and LACP, data. A switch profile, or a switch configuration file, is a file that defines the IP of the switch, the VLAN range accepted for each port, and the port bonding settings, as will be explained below. Once the proper configuration file is generated, the plug-and-play manager loads the switch profile to the designated switch through a COM port. In this example, there are two kinds of switches in the OpenStack solution, management switches and data switches. The management switch provides network access to each BMC of each node. The data switch provides networking in the OpenStack solution and network access to the Internet. Each type of switch requires a switch profile to define the capability of each port.

When AC power is connected to the rack, the BMCs of each rack node will be powered on automatically, and each will send a DHCP request to the deployment server 200. The plug-and-play manager assigns an Internet Protocol (IP) address to each of the BMCs of all nodes on the rack 150 in FIG. 1A. The plug-and-play manager collects the hardware configuration for all of the nodes (206). The plug-and-play manager collects the MAC and IP addresses of all of the BMCs of all of the nodes and dumps a management switch MAC address table to a log file (208). The plug-and-play manager parses the entries of the log file and then imports the organized data to a database that is used for the solution profile as explained above (210). The plug-and-play manager then prepares an inventory file. An inventory file contains detailed information for all of the network nodes, including the BMC IP addresses, usernames, passwords, and MAC addresses of the NIC cards. The inventory file also specifies the role of each node role (based on the "Demand-driven Cloud Architecture Design Engine" module).

The plug-and-play manager associates the server role and port mapping, and then starts an unattended BIOS configuration program for all nodes. The plug-and-play manager can identify each server attached to each management switch port as well as the IP of the BMC of each node. The BIOS for all of the nodes is configured via the configuration program (214). As will be explained below, an interface generated by the plug-and-play manager allows for different BIOS configurations to be applied to the nodes based on user input. Further, the interface allows a user to apply a specific BIOS configuration for a group of nodes, a single node or every node. After the BIOS is configured for all of the nodes in the rack system 150, the deployment server 200 powers on all of the nodes.

All the nodes of the cluster report hardware information, including disk drive names, network interface name, hardware topology, and BMC information, to the plug-and-play manager. The plug-and-play manager pulls down node information from a database and then builds templates for solution deployment. The solution deployment program powers on the director node to a pre-boot execution environment (PXE) boot, and then starts bare metal provisioning (216). In this example, the boot is performed from the network interface card of the director node. The BIOS reads the firmware on the option ROM (OPROM) of the NIC, and then executes the code to boot the director node. The director node then sends a DHCP PXE request to the deployment server 200 (218)

When receiving the PXE request, the plug-and-play manager checks the database setup to map each machine role and then updates the corresponding bootstrap for each node. The deployment server 200 responds to the DHCP client arch request from each client node (220). Client nodes may be operated in a legacy mode (222) or a unified extensible firmware interface (UEFI) mode (224). The deployment server 200 instructs the client to load a corresponding boot program per the client arch code. The deployment server 200 checks the DHCP user class (226) sent by each individual client node. If the user class is not iPXE (226), the deployment server 200 notifies the client node to load a iPXE boot loader (Undionly.kpxe) to execute (232). The client node then re-sends the DHCP request with the iPXE user class to the deployment server 200 (226). If the client node sends the iPXE user class to the deployment server 200, the deployment server 200 checks the client role via the client MAC address (230).

The deployment server 200 then loads a corresponding solution deployment module to start solution provisioning. If an OpenStack module (234) is chosen, the plug-and-play manager starts to prepare the director node (236). Alternatively, solution provisions may be provided for software-defined storage (SDS) solutions such as Ceph and Gluster. Thus, the process may be used for Ceph, Gluster, or OpenStack deployment. The deployment server 200 then determines whether the node is a director node (236). If the node is a director node, the deployment server 200 causes an image restore, where a required system will be set up on the director node (238). The director node is then rebooted (240). The OpenStack cluster is then deployed (242). The deployment server 200 then runs the cluster validation (244).

The solution deployment program starts with validation of the rack system, including functional and load tests for the deployed solution. Each of the modules shown in FIG. 1A will be described in detail below.

Figure 3A:
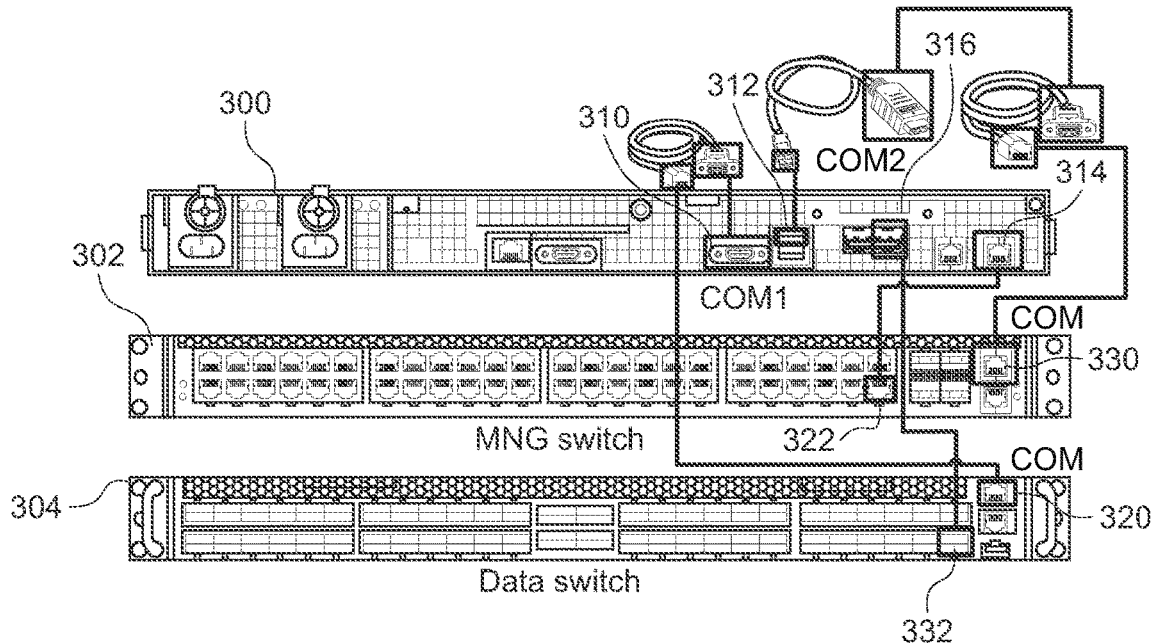
FIG. 3A is an example of switch components on a rack connected to deployment server.

The assembly of a rack involves the initial connection of cabling 110 in FIG. 1A. FIG. 3A shows an example deployment server 300, a management switch 302, and a data switch 304. The deployment server 300 includes a COM1 port 310, a COM2 port 312, a RJ45 port 314, and a small form-factor pluggable (SFP)+ port 316. The management switch 302 includes a COM port 320 and a RJ45 port 322. The data switch 304 also includes a COM port 330 and a SFP port 332.

As shown in FIG. 3A, during initial hardware preparation, a cable is installed to connect the COM1 port 310 of the deployment server 300 to the COM port 320 of the data switch 304. The data switch 304 is used for serving server data via a network on the rack.

During the initial hardware preparation, a cable is installed to connect the COM2 port 312 of the deployment server 300 to the COM port 330 of the management switch 302. The management switch 302 handles the operational data from baseboard management controllers on the nodes in the rack. The configuration of the management switch 302 is deployed through the COM2 port 312.

Any available RJ45 port of the deployment server 300, such as the RJ45 port 314, is connected by a cable to the last RJ45 port 322 of the management switch 302. This connection is made for node BMC IP assignment. Any available SFP+ port of the deployment server 300, such as the SFP port 316, is connected via cable to the last SFP+ port 332 of the data switch 304. This connection is made for node hardware information collection and topology information collection.

The remaining nodes, such as computing nodes, storage nodes, and controller nodes are mounted on the rack. Network cables are connected between management switch 302 and a BMC network port for each node, in accordance with a predefined cabling policy. Network cables are connected from the data switch 304 and ports of network interface cards for each node, in accordance with the predefined cabling policy.

Figure 3B:
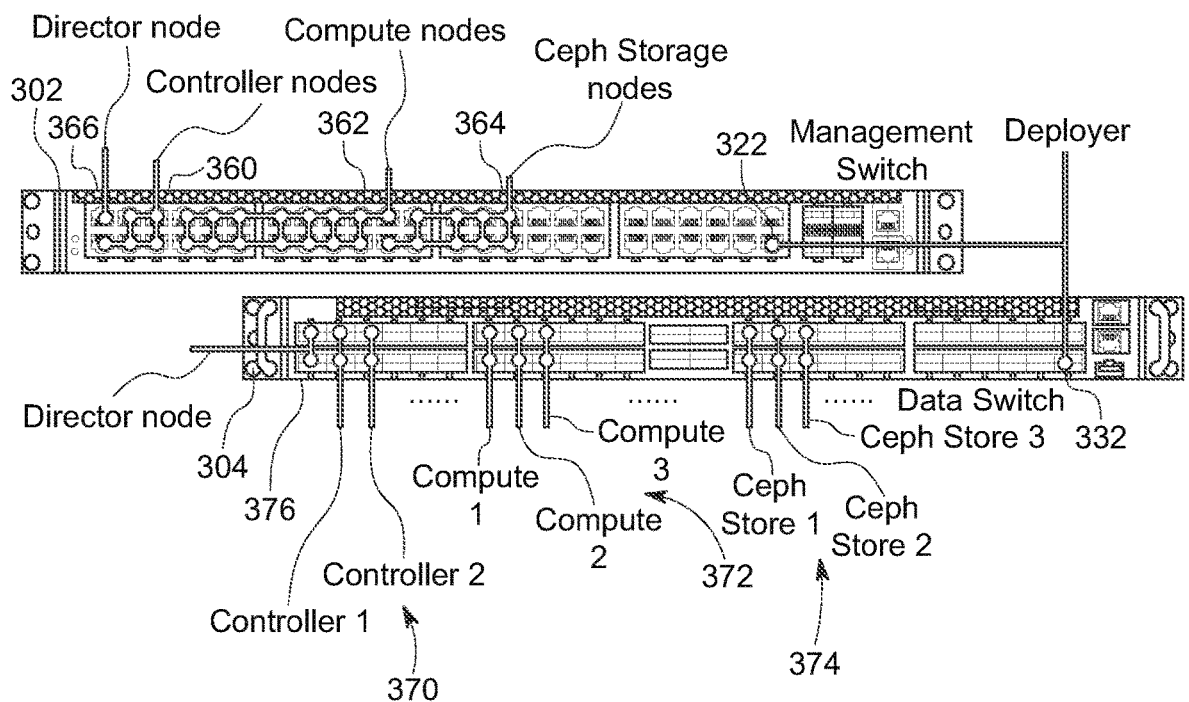
FIG. 3B are the switch components and different ports for connection to rack components.

FIG. 3B shows an example of ports for cable connection between the management switch 302, the data switch 304, and nodes in the rack. The management switch has a series of controller node ports 360, a series of computing node ports 362, a series of software storage node ports 364, and a director node port 366. In this example, the storage node ports are Ceph protocol ports. The ports 360, 362 and 364 are connected to ports for communication of the BMCs of controller nodes, computing nodes, and storage nodes respectively. The port 366 is connected to a port for communication with the BMC of a director node. The data switch 304 also includes controller ports 370, computing ports 372, storage ports 374, and a director port 376. The ports 370, 372, and 374 are connected to the NICs of controller nodes, computing nodes, and storage nodes respectively. The port 376 is connected to the NIC of the director node. As explained below, the management switch 302 and the data switch 304 are connected to the deployment server 300 in FIG. 3A.

The system 100 (in FIG. 1A) allows for automatic identification of hardware topology that assists a user to map the logical device name and physical location of each rack node. Thus, the system 100 allows a user to identify whether selected hardware is a NUMA-balanced design, and thus there is no need to inspect the hardware block diagram manually for solution deployment. The system 100 enables a user to easily associate logical device names and physical locations without physically having to examine the node. This mechanism can reduce the complexity of hardware information location. The system enables a user to know each NIC name for automatic software provisioning such as through an automation platform for workflow control, such as Ansible, without booting the operating system of the node.

The system 100 may use two methods to achieve the automatic identification of hardware in step 206 in FIG. 2. Both methods leverage the PCI configuration space setup with the intelligence to discover NIC logical device names to assist a user to locate the designated NIC, without involving an operating system.

Figure 4A:
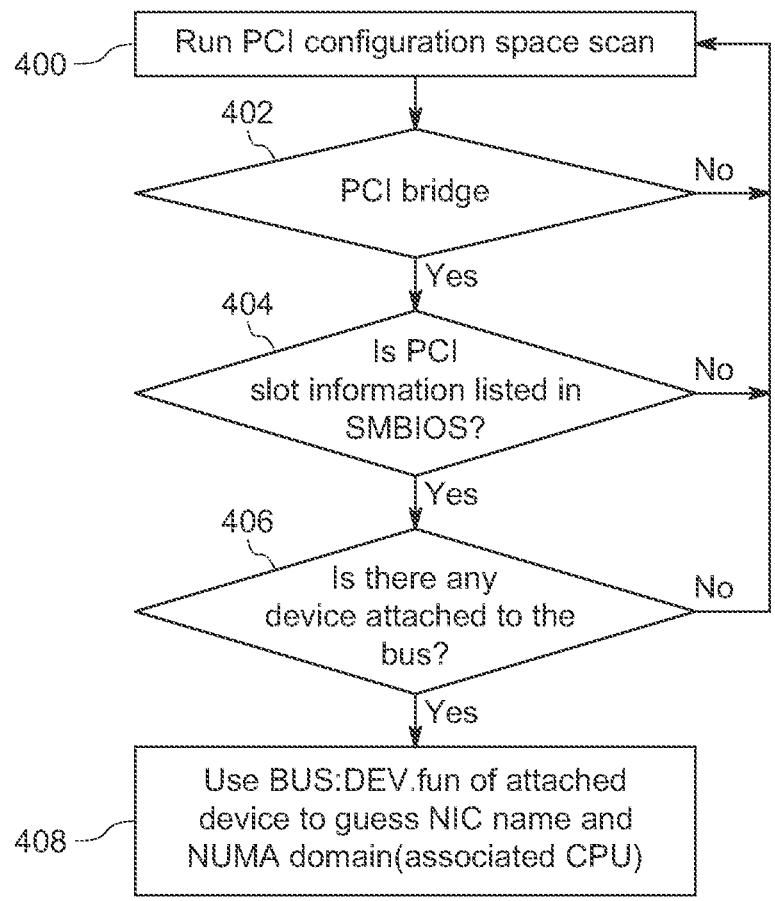
FIG. 4A is a flow diagram of an example method for automatic discovery of network hardware.

A flow diagram of the first method is shown in FIG. 4A. The flow diagram in FIG. 4A outlines a process of discovery without firmware change. A PCI configuration space scan is run to find the association between PCIe cards, PCI bridges, and NUMA nodes in the system (400). The slot information for the PCI bridge is extracted from the system management BIOS (SMBIOS) (402). If slot information is not available, the process returns to run a PCI configuration space scan (400). The process determines whether PCI slot information is listed in the SMBIOS (404). If the PCI device class is not a PCI bridge (slot), the process returns to run a PCI configuration space scan (400). The process then determines whether there are any devices attached to the bus (406). If no devices are attached, the process returns to run a PCI configuration space scan (400). The device function of the PCI bridge bus is used as a key to associate the PCI configuration space with SMBIOS data. The process then uses the PCI configuration space setup to discover the NIC display name and the NUMA domain in the operating system (408). For example, the process may use "vid" and "did" to search a PCI database for the device display name. The process may use a bus number to identify the device NUMA domain. For example, on a two CPU socket system, a bus address 0x01 to 0x7f is for NUMA 0, and a bus address 0x80 to 0xff is for NUMA 1. This process then allows processed data to be updated to the database. The information in the database allows a user to select appropriate nodes from a pool of nodes.

Figure 4B:
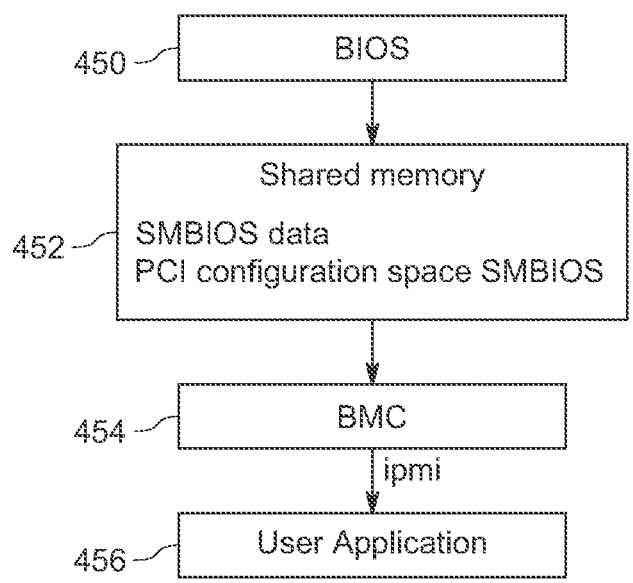
FIG. 4B is a flow diagram of an example alternative method for automatic discovery of network hardware.

FIG. 4B shows the second method that relates to discovery with a change in the firmware. A BIOS 450 is coupled to a shared memory 452 that can be accessed by the baseboard management controller, such as a baseboard management controller 454, for each node. The BIOS 450 dumps PCI configuration space to the shared memory 452 for access by the BMC 454. The BIOS 450 also dumps SMBIOS information to the shared memory 452 for access by the BMC 454. The process pulls down the PCI configuration space and SMBIOS data, and feeds the configuration space and data to an application 456 to perform data computation. The NIC display name in the operating system is discovered according to the PCI configuration space setup. The updated processed data is stored to the database for node composition.

Figure 4C:
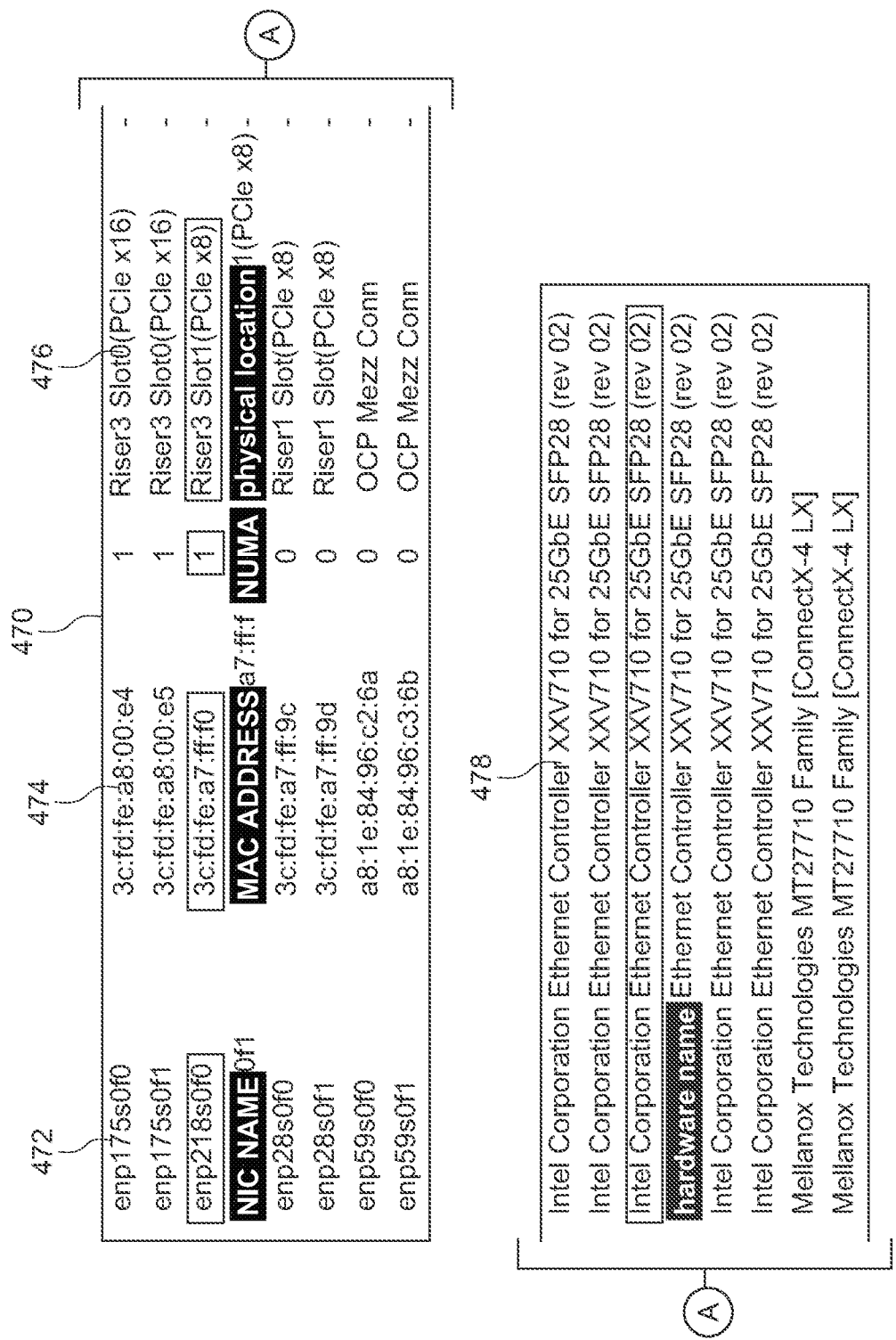
FIG. 4C is a screen image of the results of a hardware discovery process to show discovered hardware information.

FIG. 4C is a screen image 470 of a data readout showing the discovered NIC information. The screen image 470 shows the NIC name 472, a MAC address 474, a physical location 476, and a hardware name 478, that are each discovered from the PCI configuration space setup. For example, the Linux "IP address" command returns the NIC name and MAC address, while the PCT bus number of the PCI end device is used for NUMA domain location. The physical location may be obtained by locating the PCI bridge associated with the specified PCI end device and the check bridge display name from the SMBIOS.

FIG. 4D shows an example database NIC table schema that is used in the collection of MAC/IP address step 206 in FIG. 2. The information in the table may be used for user friendly location and device information, hardware topology for solution planning, and obtaining MAC addresses for solution deployment. When the BMC of a node is powered on, it will send a DHCP request to any available DHCP server such as the deployment server 200 in FIG. 2. When the deployment server 200 receives the DHCP request, it assigns an IP address to the BMC of the node. The BMC applies the assigned IP address to itself and sends an acknowledgment to the deployment server 200.

The user may browse the deployment user interface, and then input a network ID and IP address for the management switch setup. The deployment user interface may be generated by the deployment server 200 or any web-capable device accessible to the user. The deployment server 200 runs a network switch configuration program to apply the designated IP address to the management switch. The designated IP address is sent to the management switch, such as the management switch 302 in FIG. 3, through the COM1 port of a deployment server. such as the deployment server 300 in FIG. 3, or the deployment server 200 in FIG. 2.

Figures 4E, 4F:
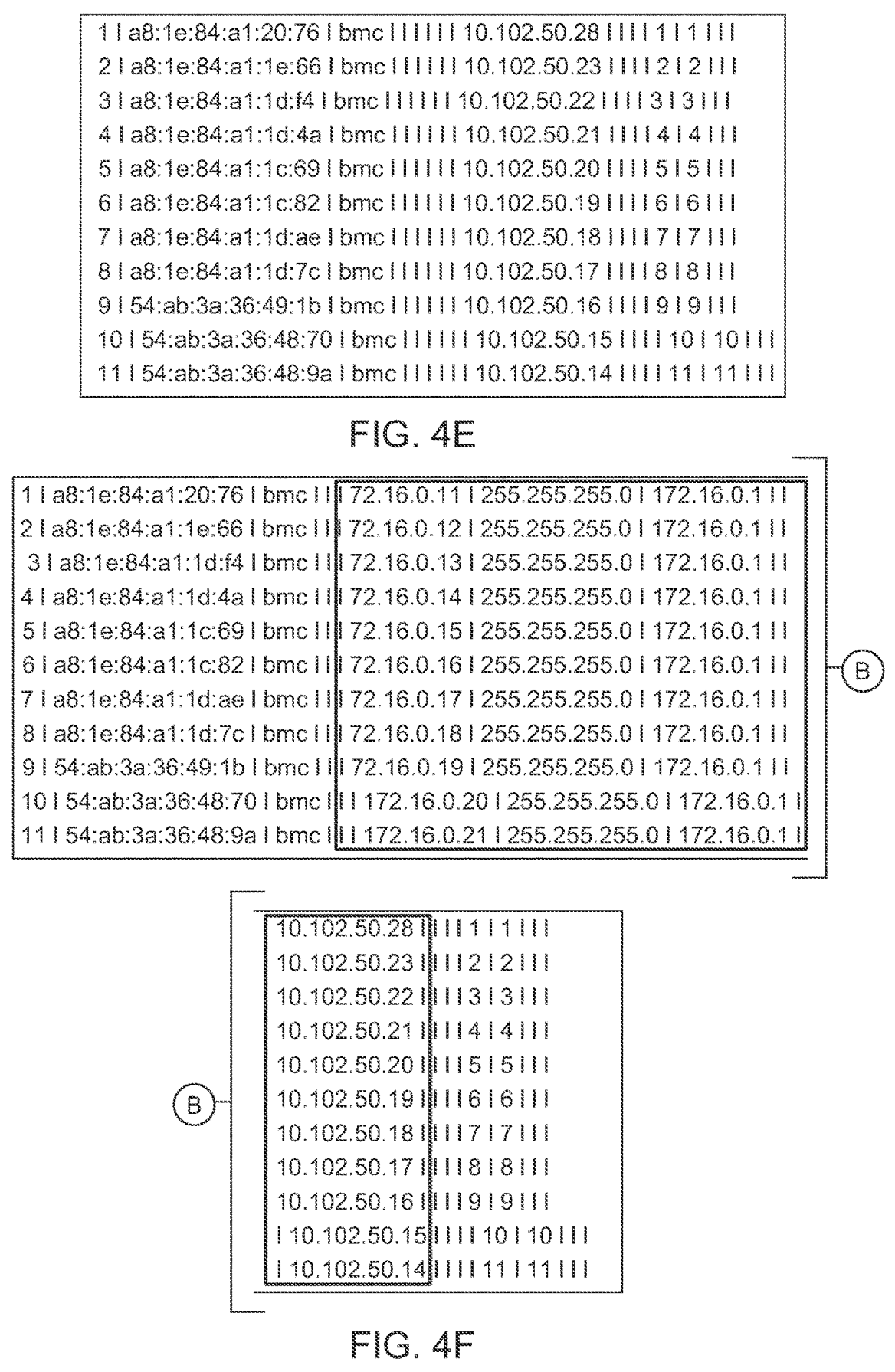

The deployment server 200 sends ICMP requests to all host IDs on a BMC provisioning network. The deployment server 200 then runs a program to dump the MAC address table from the management switch. FIG. 4E is a screen image of a MAC address table dump.

The deployment server 200 then runs another program to generate a BMC IP and management switch port mapping table. The deployment server 200 then assigns an alias IP address to the NIC port on the deployment server 200 that is used for BMC orchestration. The deployment server 200 then runs a program to change the BMC IP of all nodes according to a 4.f mapping table. FIG. 4F is a screen image of a 4.f mapping table that may be used for BMC provisioning. For example, if the default DHCP network ID is 10.102.50.0/24, and the default IP address for the deployment server 200 default is 10.102.50.254, the IP address of the BMC that is connected to management switch port 1 is 10.102.50.28. In order to change the IP address of the BMC from 10.102.50.28 to 172.16.0.11 from the deployment server 200, the deployment server 200 must be enabled to reach both networks. Thus, an alias IP 172.16.0.254 is assigned to the deployment server 200.

After the IP and MAC addresses are collected and compiled in the mapping table, the deployment server 200 will power down all of the nodes. The deployment server 200 will then send a power-on command to all nodes in the rack system. The deployment server 200 then instructs all nodes to boot into a mini-OS for node information collection. At this point, hardware topology, NIC name, and physical location mapping will be collected by one of the methods outlined in FIGS. 4A-4B above. The deployment server 200 will run a program to dump the MAC address table from the data switch, such as the data switch 304 in FIG. 3, through the COM2 port of the deployment server into a database on the deployment server 200.

FIG. 4G is a screenshot of an example collected hardware topology data for one node. FIG. 4G shows that node 12 has four network cards installed. Some of the network cards are dual-port NIC and some of them are single port NIC. The first line of the screenshot in FIG. 4G indicates that the BMC NIC of the node is connected to port 11 of the management switch, and the assigned IP address is 172.16.0.21.

As explained above, the process also includes intelligent recognition for BIOS configuration settings in a rack system, as shown in step 214 of FIG. 2. The intelligent recognition for BIOS configuration setting may be an intelligent engine, which is a software defined BIOS configuration deployment to recognize BIOS configuration settings and automatically select such settings. This mechanism will help a user to change BIOS configurations according to predefined rules processed by the intelligent engine to prevent human errors. The intelligent engine is executed by the deployment server 200 via the plug-and-play manager.

Figure 5:
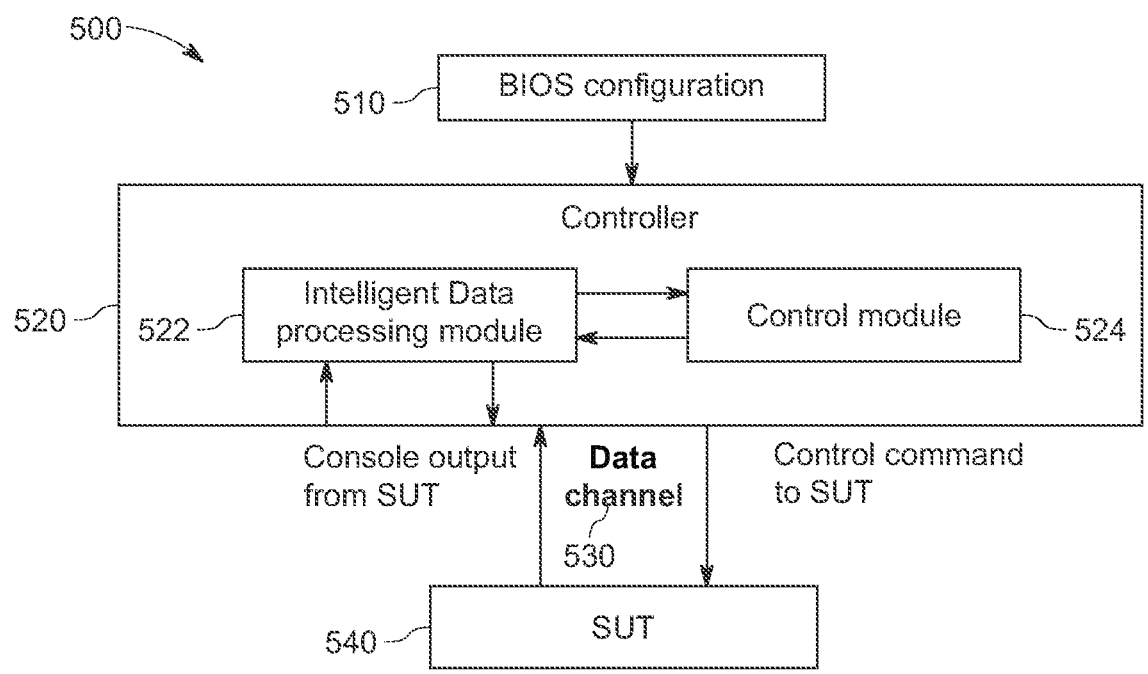
FIG. 5 is a block diagram of the architecture for an example intelligent BIOS configuration process.

FIG. 5 is a block diagram of a system architecture 500 of the intelligent recognition routine for BIOS configuration. The system architecture 500 includes a BIOS configuration file 510. The BIOS configuration file 510 is read by a controller 520. The controller 520 includes an intelligent data processing engine module 522 and a control module 524. The intelligent data processing module 522 and control module 524 are connected via a data channel 530 to a system under test (SUT) 540. The control module 524 sends control commands to the system under test 540. Console outputs from the system under test 540 are received by the intelligent data processing module 522.

Figure 6:
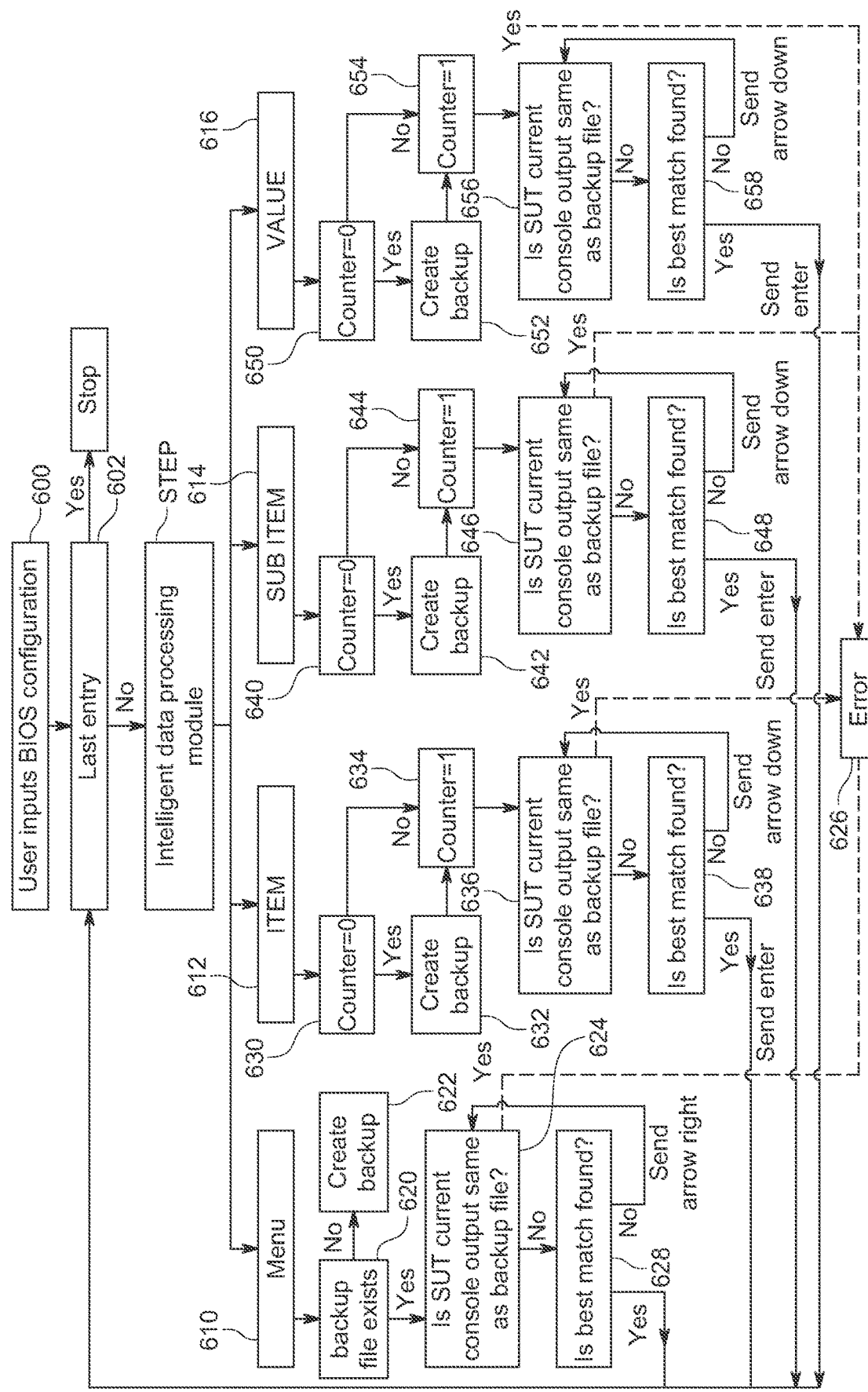
FIG. 6 is a flow diagram of the process of configuring a BIOS for a networked node.

FIG. 6 is a flow diagram of the process of intelligent recognition for BIOS configuration described above with reference to in FIG. 5. A user first enters a desired BIOS configuration into a user-defined template (600). The controller 520 determines whether the configuration is the last entry of the nodes in the rack (602). If the configuration is the last entry, then the process will stop. If the configuration is not the last entry, the controller 520 loads in configuration data from the BIOS configuration file 510 to the intelligent data processing module 522. The controller 420 establishes a connection with the SUT 540. The controller 520 reads data from the data channel 530.

The intelligent data processing module 522 may include different control logic objects, including a menu control logic 610, an item logic 612, a sub item logic 614, and a value logic 616. The controller 520 checks the input from the user, and feeds the data to the one of control logic objects 610, 612, 614, or 616 to perform data comparison via the intelligent engine 522.

If the data is a menu logic 610, the intelligent engine 522 determines whether a backup file exists (620). If a backup file does not exist, the intelligent engine 522 creates a backup file and sets a flag to indicate that the routine is processing the initial output (622). If a backup file exists, the intelligent engine 522 compares the output from the system under test 540 and determines whether the output is the same as the backup file (624). If the output is the same, the intelligent engine 522 terminates the process with an error (626). If the output is not the same, the intelligent engine 522 determines whether the best match is found (628). If the best match is found, the intelligent engine 522 enters the value and loops back to the next entry from the BIOS configuration file (602). If the best match is not found, the intelligent engine will send the arrow right and try to search the next available menu. The intelligent engine will then loop back to comparing the output to the backup file (624).

If the data is an item logic 612, the intelligent engine 522 determines whether the counter is zero (630). If the counter is zero, the intelligent engine 522 creates a backup file (632). The intelligent engine 522 then sets the counter to one (634). If the counter is not zero, the intelligent engine 522 sets the counter to one (634). The intelligent engine 522 then compares the output from the system under test 540 and determines whether the output is the same as the backup file (636). If the output is the same, the intelligent engine 522 terminates the process with an error (626). If the output is not the same, the intelligent engine 522 determines whether the best match is found (638). If the best match is found, the intelligent engine 522 enters the value and loops back to the next entry from the BIOS configuration file (602). If the best match is not found, the intelligent engine will send the arrow down and search the next available item. The intelligent engine 522 will then loop back to comparing the output to the backup file (638).

If the data is a sub-item logic 614, the intelligent engine 522 determines whether the counter is zero (640). If the counter is zero, the intelligent engine 522 creates a backup file (642). The intelligent engine 522 then sets the counter to one (644). If the counter is not zero, the intelligent engine 522 sets the counter to one (644). The intelligent engine 522 then compares the output from the system under test 540 and determines whether the output is the same as the backup file (646). If the output is the same, the intelligent engine 522 terminates the process with an error (626). If the output is not the same, the intelligent engine 522 determines whether the best match is found (648). If the best match is found, the intelligent engine 522 enters the value and loops back to the next entry from the BIOS configuration file (602). If the best match is not found, the intelligent engine will send the arrow down and search the next available sub-item. The intelligent engine 522 will then loop back to comparing the output to the backup file (648).

If the data is a value logic 616, the intelligent engine 522 determines whether the counter is zero (650). If the counter is zero, the intelligent engine 522 creates a backup file (652). The intelligent engine 522 then sets the counter to one (654). If the counter is not zero, the intelligent engine 522 sets the counter to one (654). The intelligent engine 522 then compares the output from the system under test 540 and determines whether the output is the same as the backup file (656). If the output is the same, the intelligent engine 522 terminates the process with an error (626). If the output is not the same, the intelligent engine 522 determines whether the best match is found (658). If the best match is found, the intelligent engine 522 enters the value and loops back to the next entry from the BIOS configuration file (602). If the best match is not found, the intelligent engine will send the arrow down to search for the next available value. The intelligent engine 522 will then loop back to comparing the output to the backup file (658).

Thus, the controller 520 retrieves a system under test (SUT) console output for the corresponding logic and compares the output with the backup file. If the result is different, the system loops back for the next entry in the configuration file. If the result is the same, the BIOS configuration process is terminated, and an error condition is created. This process is repeated until all BIOS configurations are applied. The process then terminates the BIOS configuration process with return code 0. The intelligent engine 522 utilizes the intelligence to collect the current console output from the SUT 540 and then starts comparing these outputs with a user defined string. If the intelligent recognition engine 522 cannot find the specified data, it will search a predefined database for the related keyword. For example, if a user enters a search for the term "boot menu" but the current BIOS only has a menu called "BIOS setup," the intelligent engine 522 will change the search pattern to BIOS setup.

In this example, a user needs to specify the terms "menu," "item," "subitem," and "value" to find the specified string. Alternatively, a user may only need to specify an item and a value for data searching. The menu and sub-item can be discovered by the intelligent engine 522. The intelligent engine 522 will be able to find the best route to the desired item in the database on the deployment server 200. Each different item and value combination will have a score, and the highest score will constitute the best route. For example, key:menu:boot-item:boot mode value:legacy has a score of 7, while key:menu:boot-item:boot order value:usb has a score of 5. When a user specifies "boot:legacy," the program will know that a user is looking for menu:boot, item:boot mode, and value:legacy.

Figure 7A:
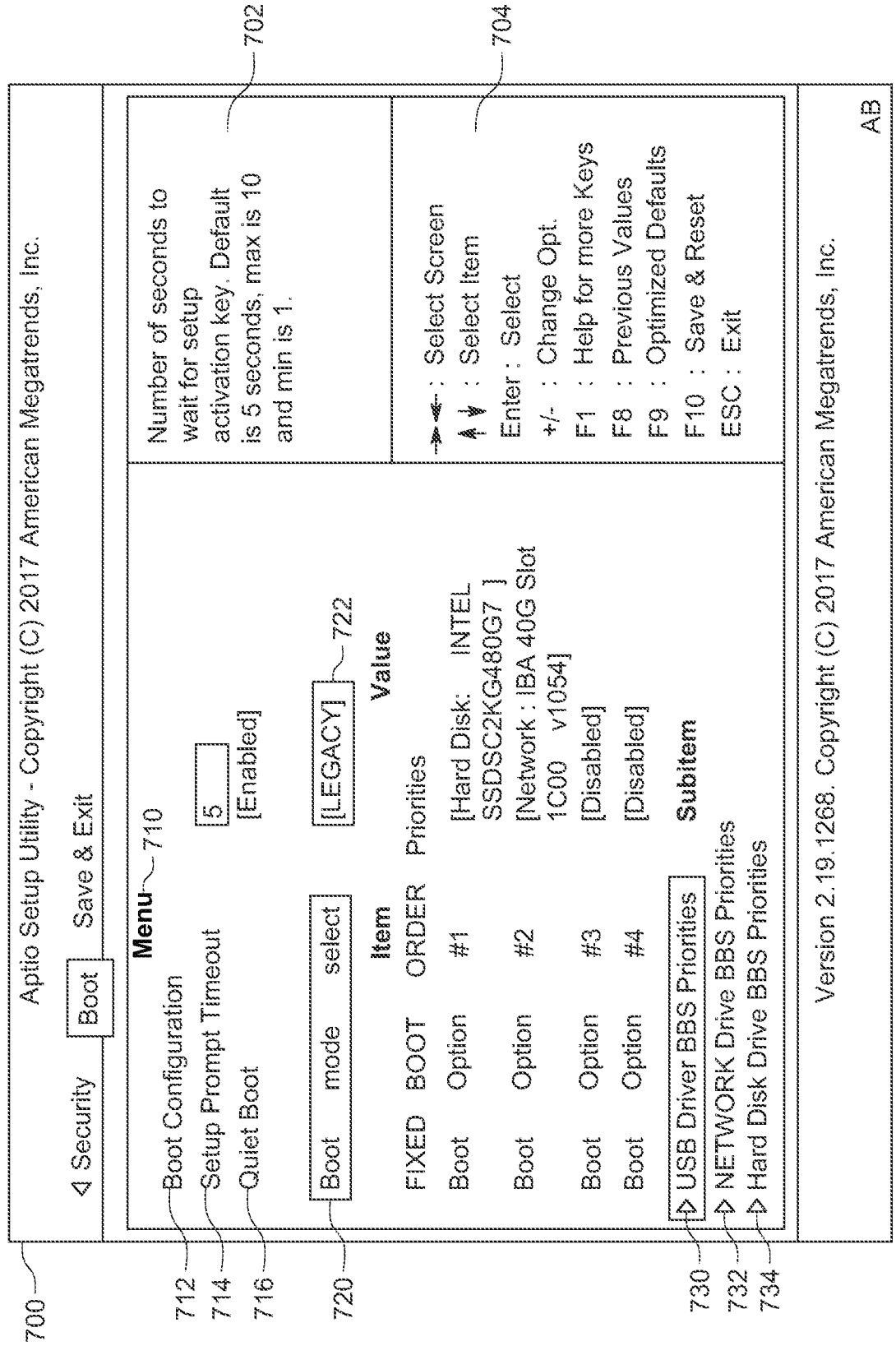

FIG. 7A is a screen image of an input interface 700 that may accept user selections for configuring a BIOS in accordance with the process described in FIGS. 5-6. The input interface 700 includes an information box 702 that includes explanations for selected logic and a command key box 704 that includes definitions for key strokes.

In this example, the input interface 700 includes a menu selection field 710. The menu selection field 710 includes a boot configuration field 712, a setup prompt time out field 714, and a quiet boot field 716. In this example, the setup prompt time out field 714 has been selected, and a user may input the number of seconds for a time out. In this example, the information box 702 includes instructions about the default (5 seconds) and the range of values that a user may enter.

The input interface 700 includes item fields and value fields. For example, the input interface 700 shows a boot mode select item field 720 and corresponding value fields 722. In this example, the item field 720 includes boot options and corresponding values. For example, the first boot option is the hard disk, the second boot option is a network slot, and the third and fourth boot options are disabled. For example, other boot options such as a removable memory device that may be inserted into a USB port, may be made available. The input interface 700 also includes different subitem fields, such as a USB drive BBS priorities subitem field 730, a network drive BBS priorities subitem field 732, and a hard disk drive BBS priorities field 734. Selection of a subitem allows a user to set the priorities for the boot device. For example, if there are four hard disk drives on the system that may be used as the operating system drive, then the hard disk drive BBS properties sub-menu may be used to define the boot order of the hard disk drives. For example, the hard disk drive boot order can be disk 2, then disk 3, then disk 1, and finally disk 4. As for the boot option for a hard disk drive, the menu only provides the default hard disk drive to the user to choose. In this example, disk 2 would thus be the only one option for hard disk boot shown on the interface.

Figure 7B:
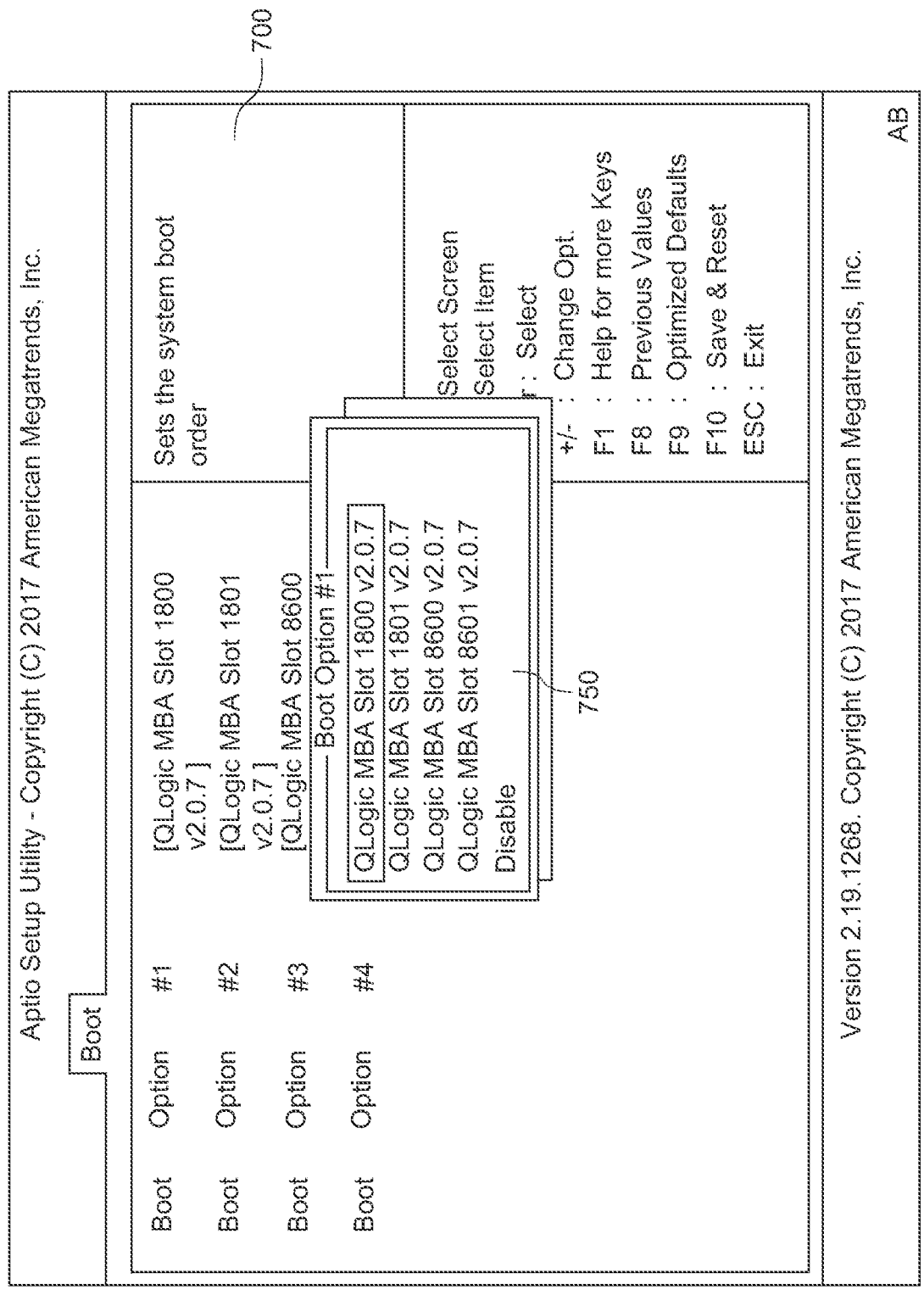
Figure 7C:
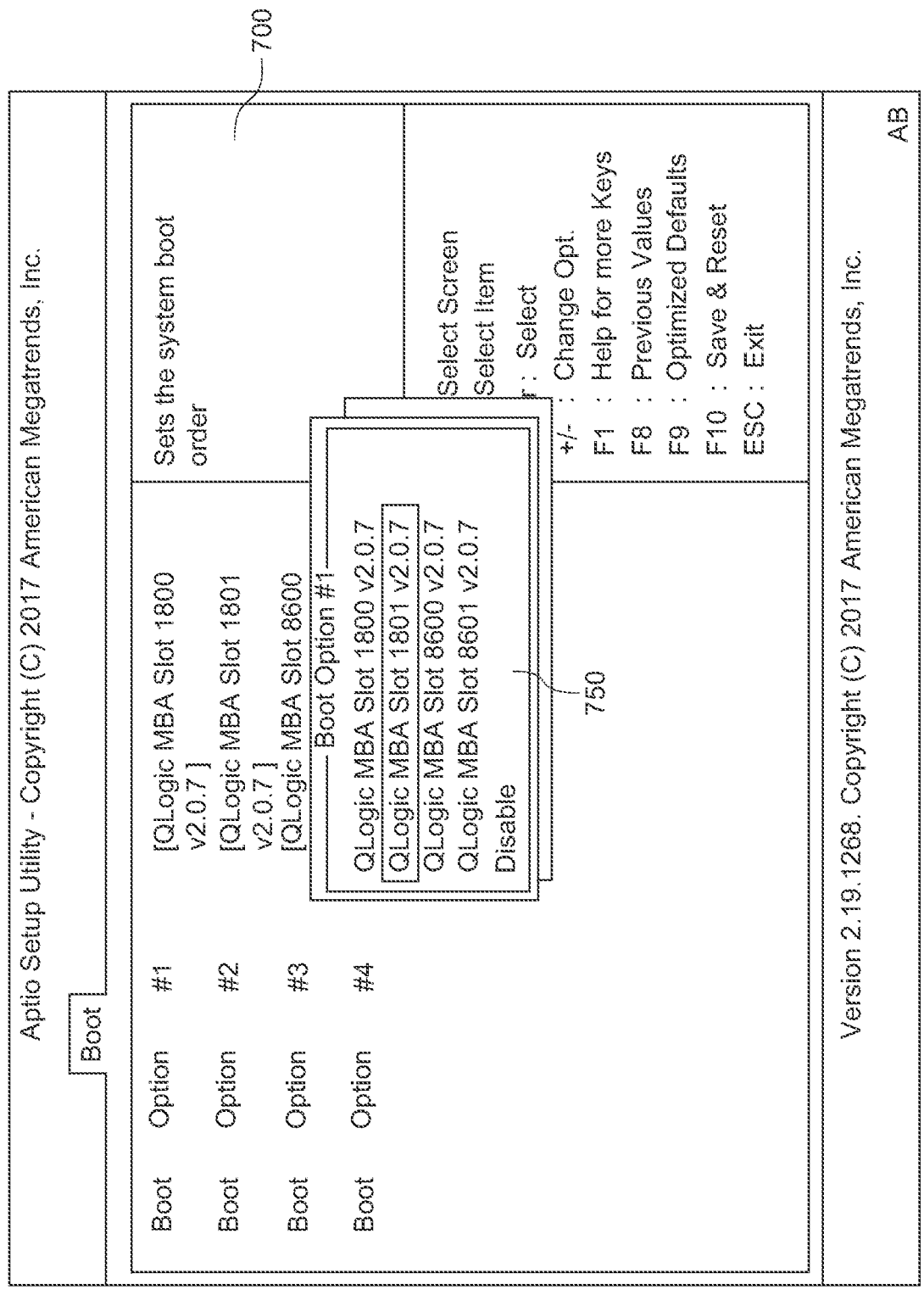

FIG. 7B shows a screen image of a pop up window 750 of the input interface 700 that shows the selection of one of the options under the item field 732 (in FIG. 7A). Thus, a user has selected the Network Drive BBS properties and all available network interface cards, which may be used for a network boot as shown in the pop up window 750. FIG. 7C shows a screen image of the pop up window 750 with another option selected. Thus, a user has selected the second boot option shown in the pop up window 750. FIG. 7D shows logs of the BIOS configuration deployment program.

As explained above, the deployment system 100 in FIG. 1A provides overall solution deployment to setup and plan a cloud architecture from hardware to software layer. The system will design the software architecture, according to the hardware layout that is collected from an agile hardware topology discovery mechanism, and a series of customer requirements via design engine. The design engine (termed a "Demand-driven Cloud Architecture Design Engine") may be executed on the deployment server or another device. The design engine deploys the OpenStack cloud environment automatically without human intervention.

The design engine may be divided into an architecture designer module and a solution deployment module. The architecture designer module designs the deployment plan by collecting customer requirements from a user interface.

The collected customer requirements involve defining the total number of nodes in the designated cluster. The overall workload for each computing node or whole cluster, for example, is defined. For example, requirements may include the following: (a) each computing node should be able to support least 20 virtual machines (VM)s, and the whole cluster should be able to support at least 200 VMs; (b) each VM should have at least 20 GB of disk space, 8192 GB memory, 6 vCPUs with CPU pinning, 2 single root input/output virtualization (SR-IOV) NICs across 2 physical NICs, and 1 management NIC with associated floating IP; (c) the overcommit ratio should be at most 8.0; and (d) the overall architecture should support high availability in networking.

The customer requirements may also define other cluster related settings. For example: (a) the architecture should support high availability in networking; (b) the architecture should support high availability in storage; (c) the architecture should support high availability in disk (e.g., enable a RAID to set up two disks as a single logical device for the backup); and (d) the architecture should have two provider networks with SR-IOV support. Other required settings are collected, such as the network IP/subnet/VLAN assignment. This information may be provided by customers based on their production environment.

Figure 8:
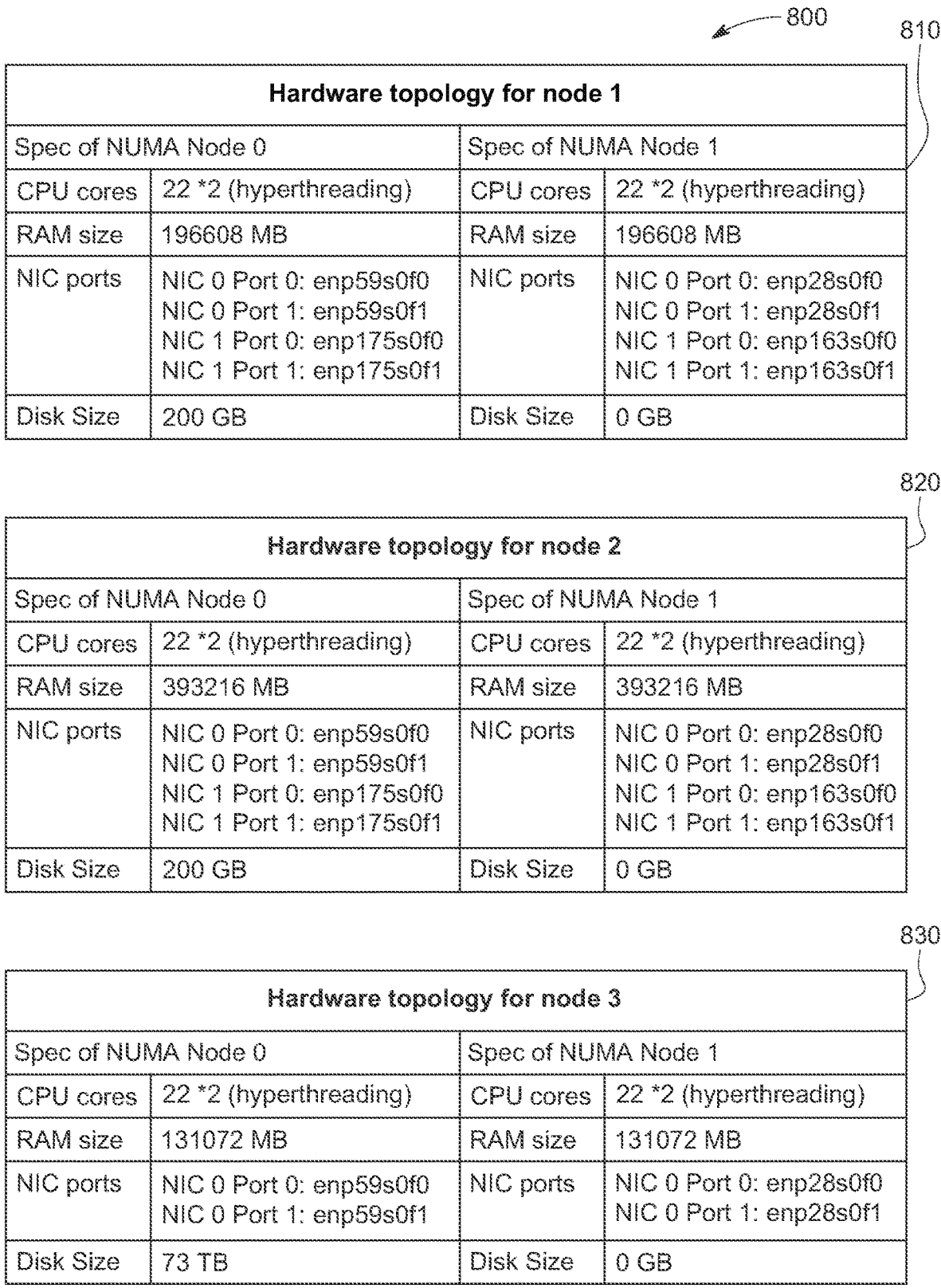
FIG. 8 is an example set of tables of hardware topography data of nodes in a rack system.

The engine then collects the hardware topology of the rack or cluster as explained above. FIG. 8 shows an example of a set of tables 800 of the results of the collection of hardware topology. In this example, a table 810 includes hardware topology data for Node 1; a table 820 includes hardware topology data for Node 2; and a table 830 includes hardware topology data for Node 3. As shown in the tables 810, 820, and 830 in FIG. 8, the CPU cores, RAM size, NIC ports, and disk size are collected for each of the computing nodes.

Figure 9A:
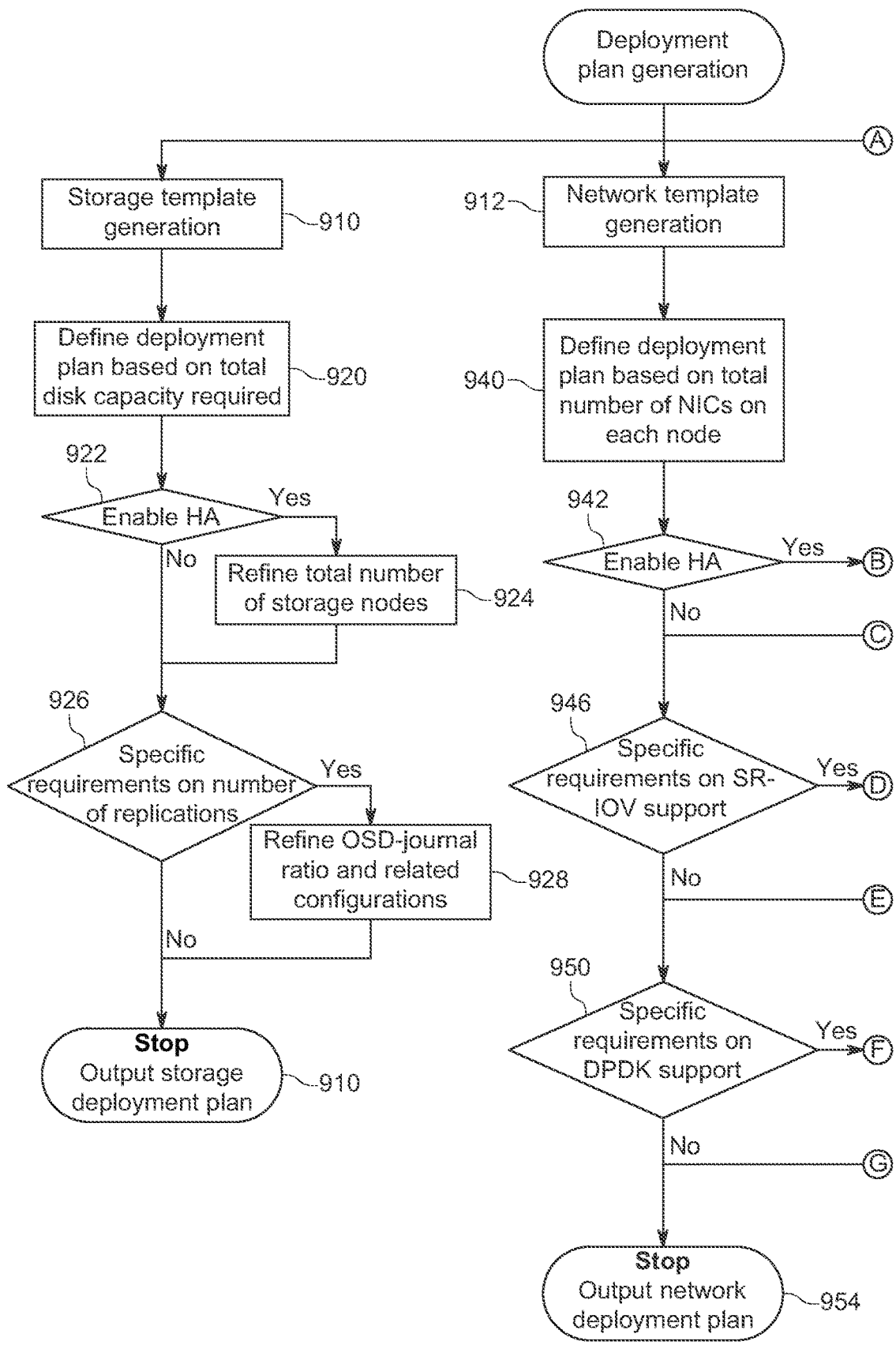
FIGS. 9A-9B are a flow diagram of a deployment plan providing templates for cloud based deployment.
Figure 9B:
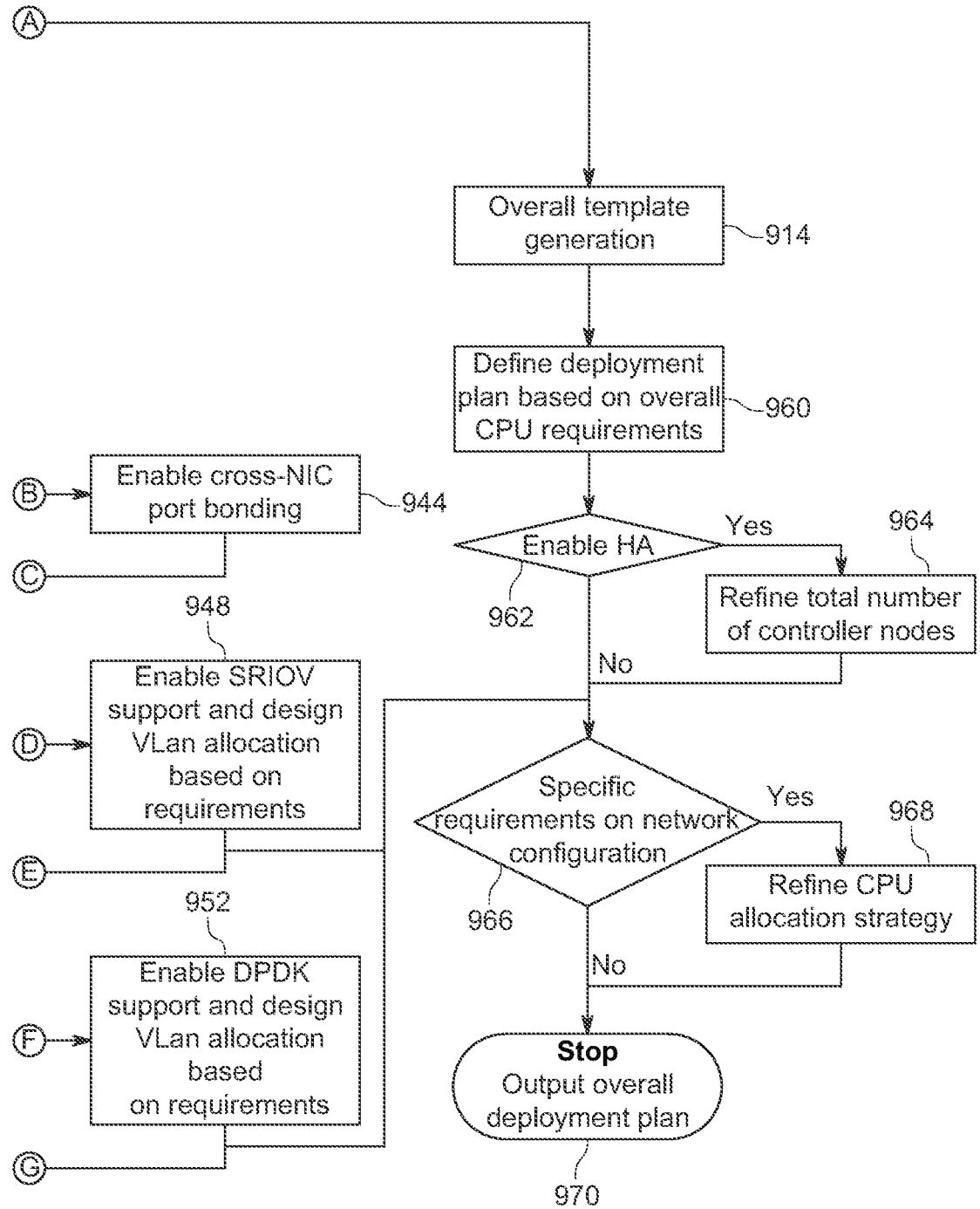

FIGS. 9A-9B shows a decision workflow of a cloud architecture design engine design deployment plan based on the aforementioned requirements. FIGS. 9A-9B show that the example design deployment plan is divided into three parts: (1) a storage template generation process 910; (2) a network template generation process 912; and (3) an overall template generation process 914.

In the storage template generation process 910, the architecture designer will first generate templates based on total disk capacity required (920). The process will check if a customer requested to enable high availability (HA) (922). If HA is enabled, the total number of storage nodes is refined to accommodate high availability (924). In order to deploy the OpenStack solution, it is necessary to identify how many storage nodes are expected for the solution. First, the required storage space is calculated based on customer requirements. For example, in Ceph storage systems, three replications for each data file is made by default. Thus, the required storage space is multiplied by at least 3 or more, depending on customer requests, and then calculated for the total number of storage node requires. In order to fulfill high availability, there will be a minimum of three storage nodes in this case. Thus, the system shall remain functional even if one or more of the storage node crashes. After the total number of storage nodes is refined, or if the customer did not request enabling HA, the process determines whether there is a customer request to adjust the number of replications (926). If there is a customer request, the Ceph OSD journal ratio is refined (928). The OSD is the storage daemon for Ceph storage. It is responsible for storing objects on a local file system and providing access to them over the network. The journal is where data is initially written before it is flushed to an OSD. The OSD journal ratio defines how many OSD(s) will be controlled by one single journal disk. The storage template is one of the configuration files for OpenStack deployment. A OSD-journal map is configured in the storage template. If there is a customer request, the value in the storage template is adjusted in accordance with the request. After refining the Ceph OSD-journal ratio, or if there is no customer request for replications, the process outputs the storage deployment plan having the required number of storage nodes and Ceph OSD journal ratio (930).

In the network template generation process (914), the architecture designer will first generate templates based on the total number of NIC ports (940). The process then checks if there is a customer request to enable HA (942). If there is a customer request for HA, the templates are refined to enable cross-NIC port bonding (944). Network bonding, or link aggregation, is a technology that combines multiple network connections/NICs in parallel to increase throughput or provide redundancy. Cross-NIC port bonding includes selecting one of the NIC ports from 2 different NICs and configuring then as a network bond. In this case, the network connection shall remain functional even if one of the NICs, one of the ports, or one of the network cables is broken. After refining the template, or if there is no customer request for HA, the process checks if the customer request includes having single root input/output virtualization (SR-IOV) support (946). If there is a customer request, the SR-IOV feature and design related VLAN configurations are enabled (948). As explained below, this configuration change will also be fed back as an item in overall template generation process (914).

After the SR-IOV feature and VLAN configurations are enabled, or if there is not customer request, the process checks if a customer requested to have data plane development kit (DPDK) support (950). If the customer requested DPDK support, the process enables the DPDK feature and design related VLAN configurations (952). This configuration change will also be fed back as an item in the overall template generation process (914). After enabling the DPDK feature, or if the customer did not request the DPDK feature, the process outputs the network deployment plan with appropriate cross-NIC port bonding, SR-IOV support, DPDK support, and VLAN configurations (954).

The overall template generation process 914 mainly focuses on controller node design and CPU core allocation strategy. The architecture designer will first generate templates based on the total number of vCPUs required and total cores for each node (960). The process checks if customer requested enabling HA (962). If the customer request for HA was made, the process refines the total number of controller nodes (964). Ordinarily, only a minimum of one controller node is required. However, if HA is requested, a minimum of three of controller nodes is required. In this case, the OpenStack control plane will remain functional even if one or more of the controller nodes crashes. After refining the total number of controller nodes, or if the customer has not requested enabling HA, the process checks if the customer requested a specific network environment such as SR-IOV or DPDK from the network template generation process 912 (966). If the customer requested a specific network environment, the process refines the CPU allocation strategy (968). The overall template is one of the configuration files for OpenStack deployment. There are several CPU allocation lists that are defined for either VM or DPDK host processes. If a customer requests a DPDK network on the OpenStack solution, CPU cores are allocated for DPDK processes to use. If this is not the case, the CPU allocation list is set only for host processes and virtual machines (VM)s. After refining the CPU allocation, or if the customer has not requested a specific network environment, the process outputs the overall deployment plan that includes the total number of controller nodes and CPU allocation (968).

The hardware topography data from the tables shown in FIG. 8 may determine solution role tagging that may be performed by the deployment server 200 in FIG. 2. For example, the deployment server may collect the number of each node for the roles defined in the storage template generation 910, the network template 912, and the overall template 914. For example, based on the templates, the desired numbers of controller nodes, computing nodes, and storages node may be 1 each.

Once the desired numbers of nodes are determined, the deployment server 200 tags a role for each node in the cluster. From the table 830 in FIG. 8, Node 3 has only 2 NICs but has 73 TB of available disk space, and thus Node 3 is tagged as a storage node. The hardware components are basically the same between Node 1 and Node 2, as shown by the tables 810 and 820. However, Node 2 has a larger RAM size. Thus, Node 2 is tagged as a computing node, and Node 1 is tagged as a controller node. Once the roles are tagged for each node, the tagged roles are updated back to the database in the deployment server 200.

The solution deployer handles the overall deployment process to build the designated OpenStack cloud environment. After the architecture designer finishes the deployment plan, the solution deployer generates required deployment templates; provisions the operating system and register system to official channels; and deploys overall solutions automatically. FIG. 10A shows a backend log generated by the deployment of the configurations from the templates generated using the process of FIGS. 9A-9B based on the deployment plan. FIG. 10B is a standard back end log for an OpenStack solution deployment, such as an Ansible playbook for the solution deployment.

The plug-and-play manager of the deployment server 200 may generate a user interface to guide a user through the provisioning and deployment process for a cluster or rack of devices. A user imports a configuration file generated by a user interface. When the file is imported and submitted, a user configuration interface is displayed by the deployment server 200. FIGS. 11A-11E shows screen images of a configuration interface 1100 allowing the selection of the cluster switch, network, and overcloud configurations. As may be seen in FIG. 11A, the configuration interface 1100 includes a status bar 1102 that includes four informational displays, a general information display 1110, a switch configuration display 1112, a director and control plane network display 1114, and an overcloud display 1116. Each of the stages 1110, 1112, 1114, and 116, when selected, generates an informational display. A series of control buttons 1118 (back and confirm & next) allow a user to navigate between displays.

Figure 11A:
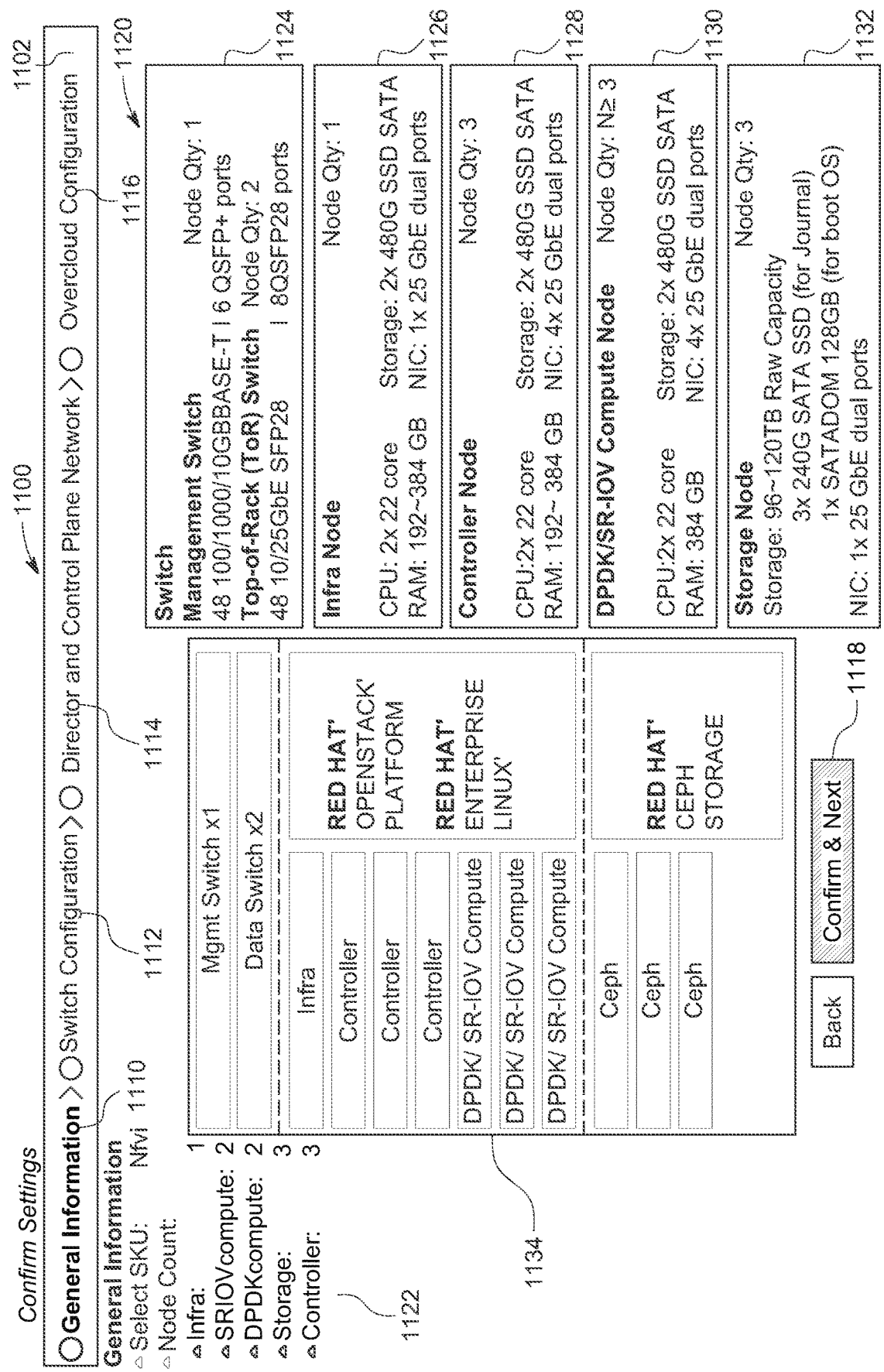

In FIG. 11A, the general information display 1110 has been selected, and a general information display 1120 is displayed. The general information display 1120 allows a user to confirm the selected SKU and node count information. The general information display 1120 thus includes a summary information field 1122, a switch information field 1124, a director node (infra) field 1126, a controller node information field 1128, a DPDK/SR-IOV compute node information field 1130, and a storage node information field 1132. These fields include information about the hardware for each of the nodes and switches. The information may include types of CPUs, ports, RAM, NICs, storage, and node quantity. The display 1120 also includes an architecture map 1134 representing the layout of the nodes and switches for user reference.

FIG. 11B shows the selection of the switch configuration display 1112, which results in displaying a switch configuration display 1140. The switch configuration display 1140 allows a user to confirm the switch configuration. In this example, the graphic representing a single management switch is displayed. However, if the system includes multiple management switches, graphics representing the multiple management switches may be displayed. The switch configuration display 1140 includes a ports chart 1142 that has a key 1144 showing the type of node connected to each port in the chart 1142. The switch configuration display 1140 includes a table 1146 that includes information for each node, including port number, BMC IP, BMC network, BMC gateway, and the role of the node.

Figure 11C:
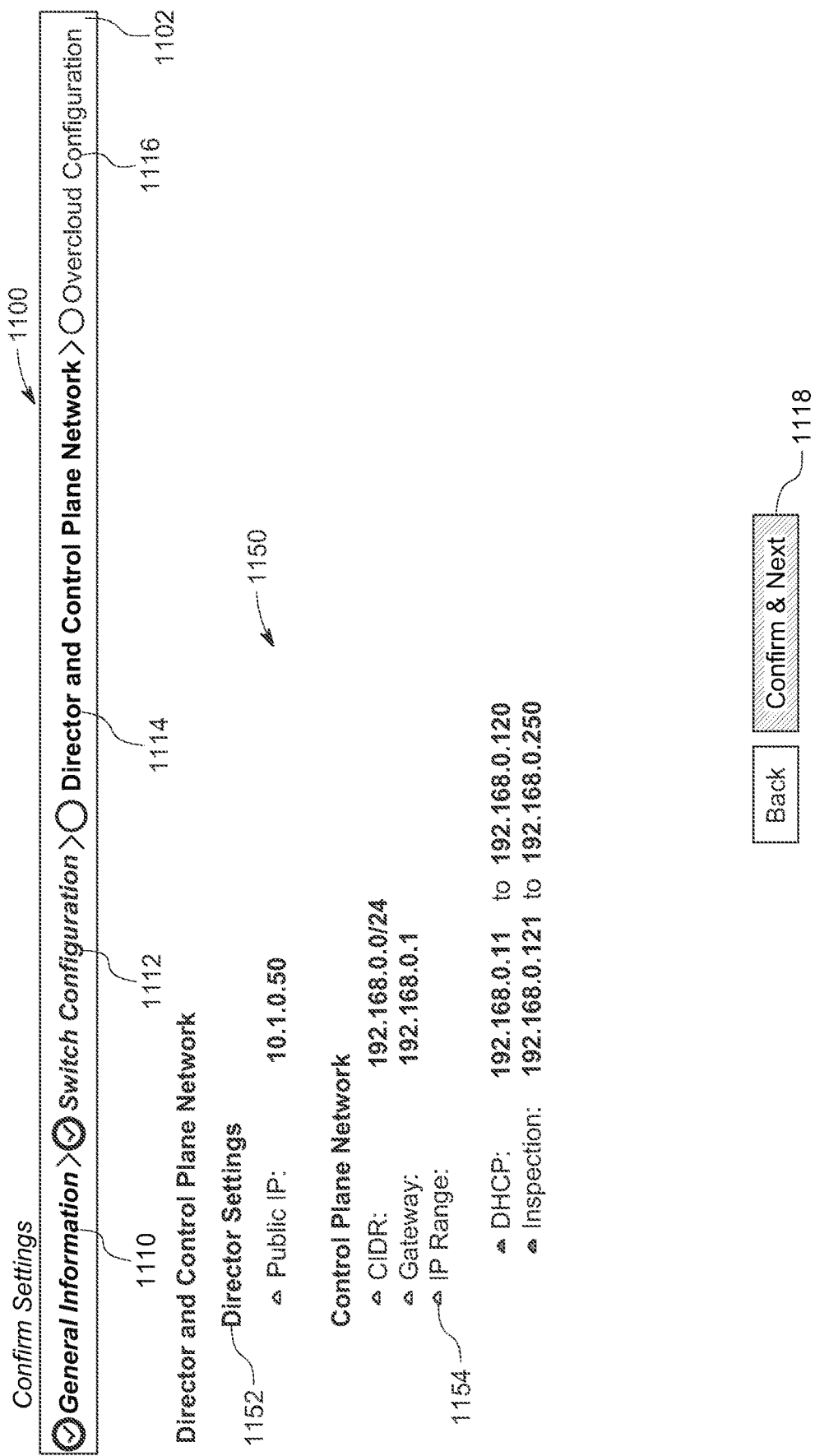

FIG. 11C shows the selection of the director and control plane network display 1114, which results in displaying a director and control plan network display 1150. The director and control plane network display 1150 allows a user to confirm the network settings of the OSP director node and control plane network. The display 1150 includes a director settings field 1152 that includes the IP address of the director node. The display 1150 includes a control plane network field 1154 that includes information such as addresses for the control plane network.

Figure 11D:
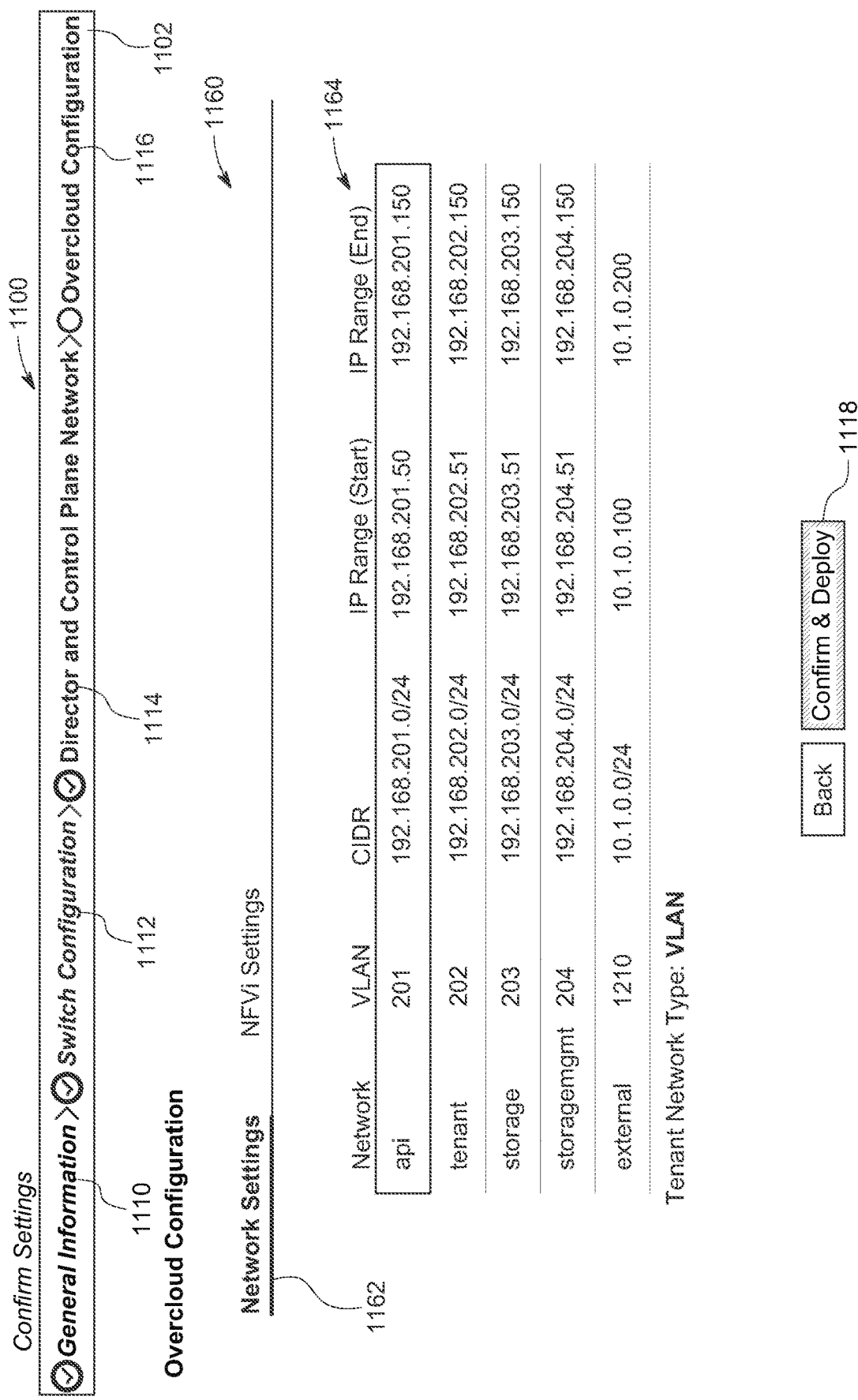
Figure 11E:
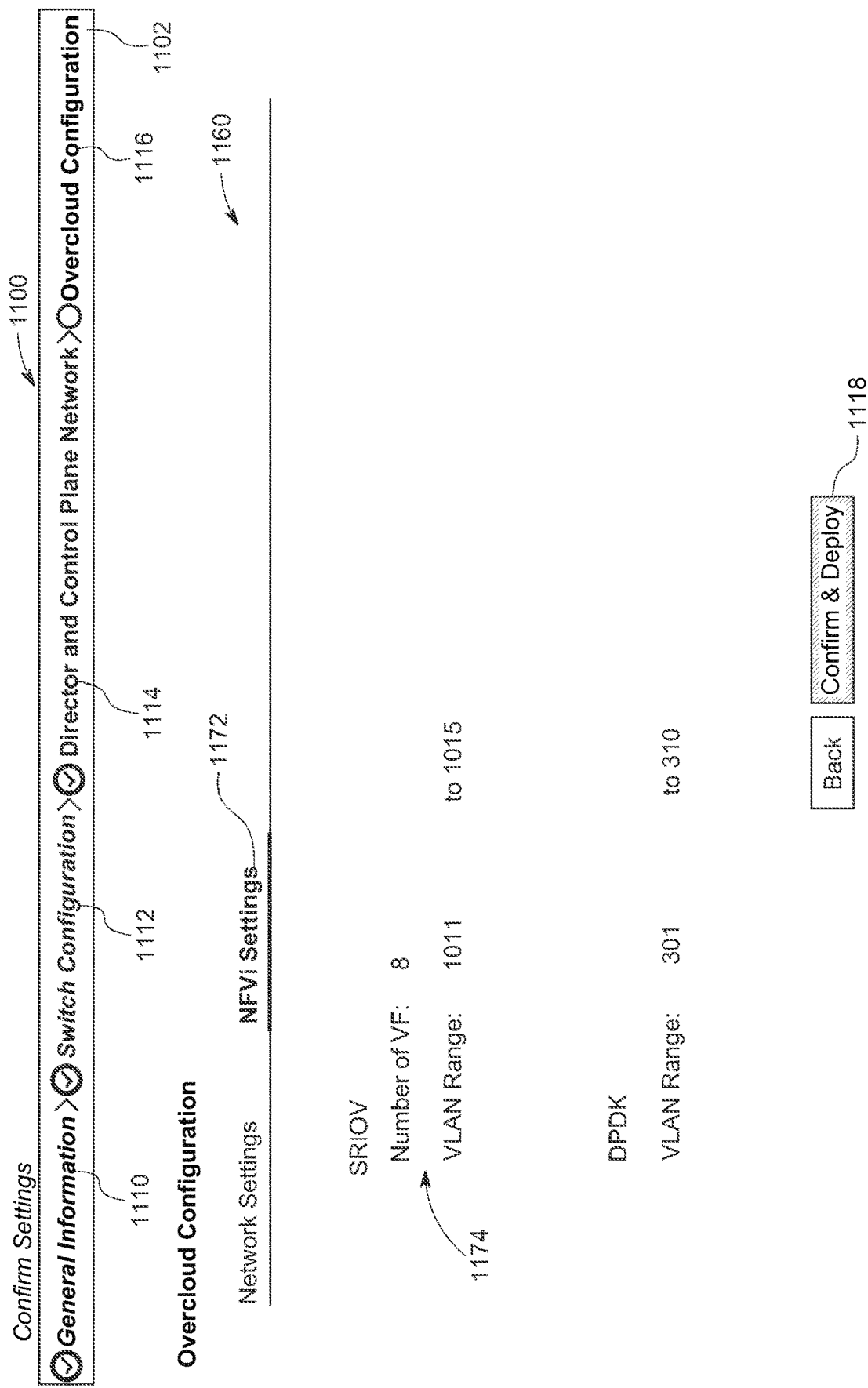

FIGS. 11D-11E shows the selection of the overcloud configuration display 1116, which results in displaying an overcloud configuration display 1160. The overcloud configuration display 1160 allows a customer to confirm the network settings of an OpenStack solution. FIG. 11D shows the selection of a network setting option 1162. A network summary table 1164 is thereby displayed that shows each network name, VLAN name, Classless Inter-Domain Routing (CIDR) address, staring IP range, and ending IP range. FIG. 11E shows the selection of a NFVi settings option 1172. A summary table 1174 is thus displayed that shows the Single Root I/O virtualization (SR-IOV) number of virtual functions (VF)s, and corresponding VLAN ranges as well as the DPDK corresponding VLAN ranges.

FIGS. 12A-12F show a screen images of a configuration interface 1200 that allows for configuration of the hardware in the network system by a user. As may be seen in FIG. 12A-12B, the configuration interface 1200 includes a status bar 1202 that includes five stages, a select solution SKU stage 1210, a configure cluster stage 1212, a configure OSP Director stage 1214, a configure OSP overcloud stage 1216, and a review settings stage 1218. A user may navigate between interfaces using a direction key(s) 1204. Each of the stages 1210, 1212, 1214, 1216, and 1218, when selected, generates a selection interface.

Figure 12A:
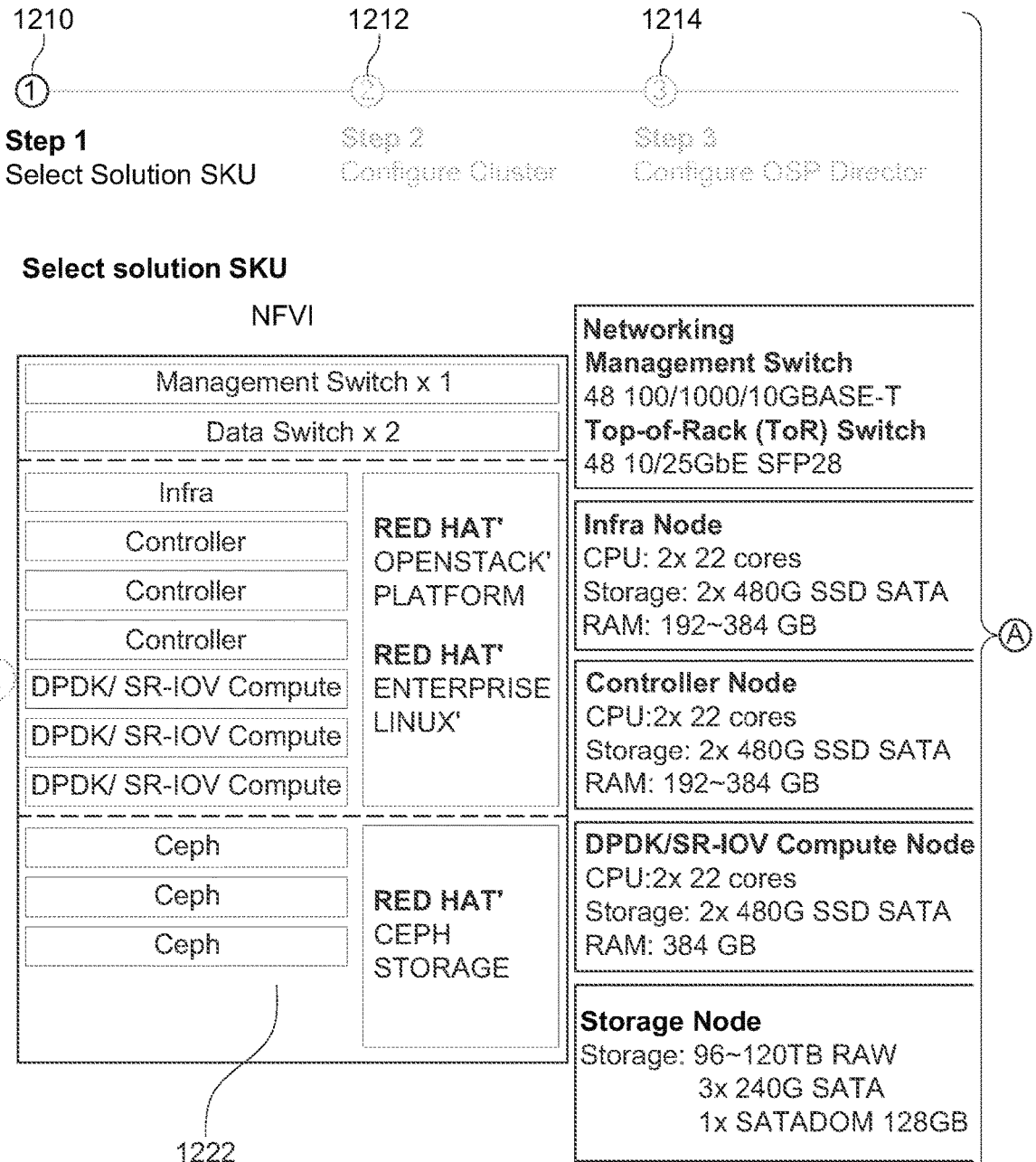
FIG. 12A-12H are screen images of user interfaces that allow a user to enter network requirements.
Figure 12B:
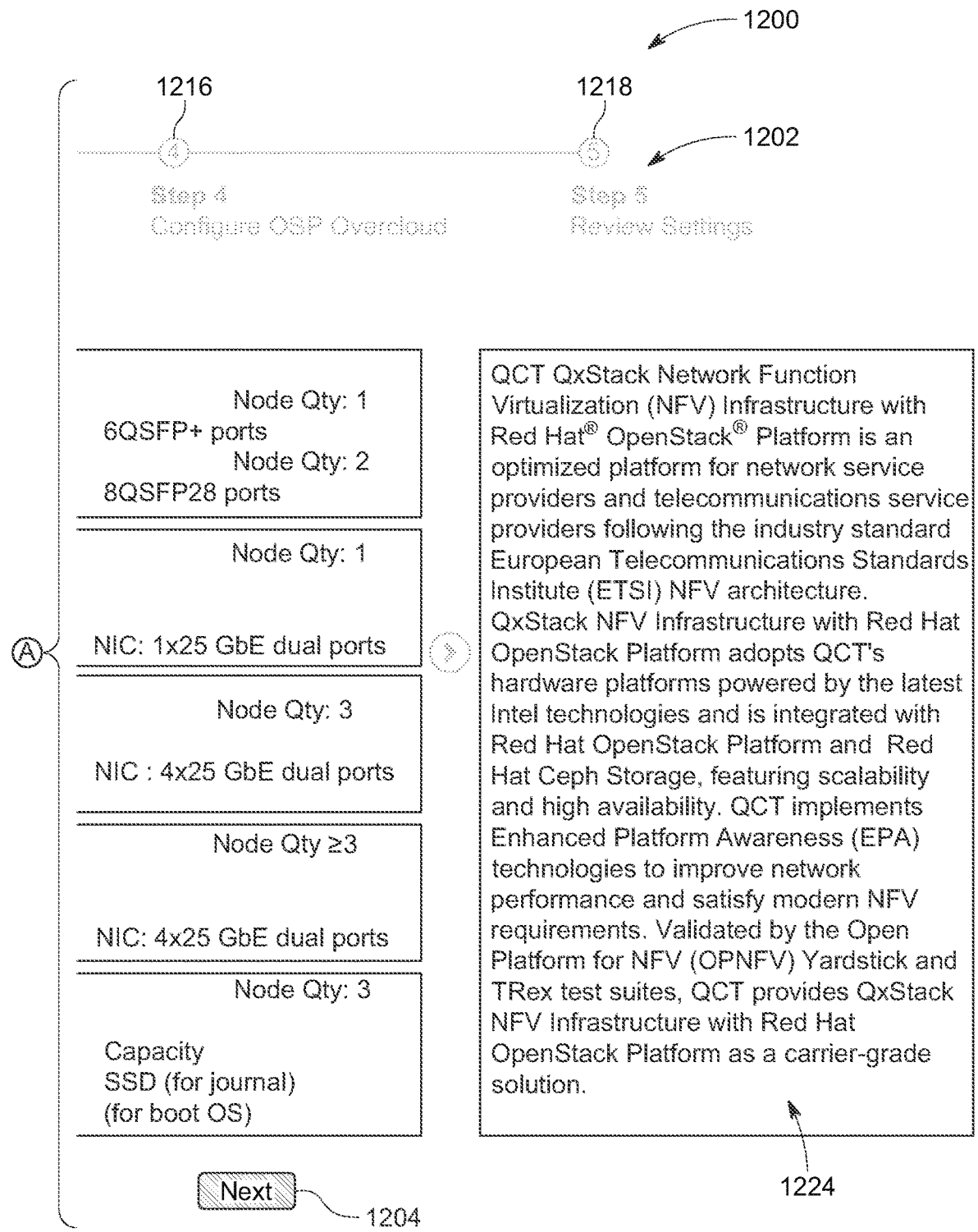

FIGS. 12A-12B show the selection of the select solution SKU stage 1210 that results in the display of a select solution interface 1220. The solution interface 1220 displays a hardware map 1222 and a description field 1224. The hardware map 1222 shows the cloud platform architecture for reference. The description field 1224 includes detailed information on selected devices shown in the hardware map 1222.

Figure 12C:
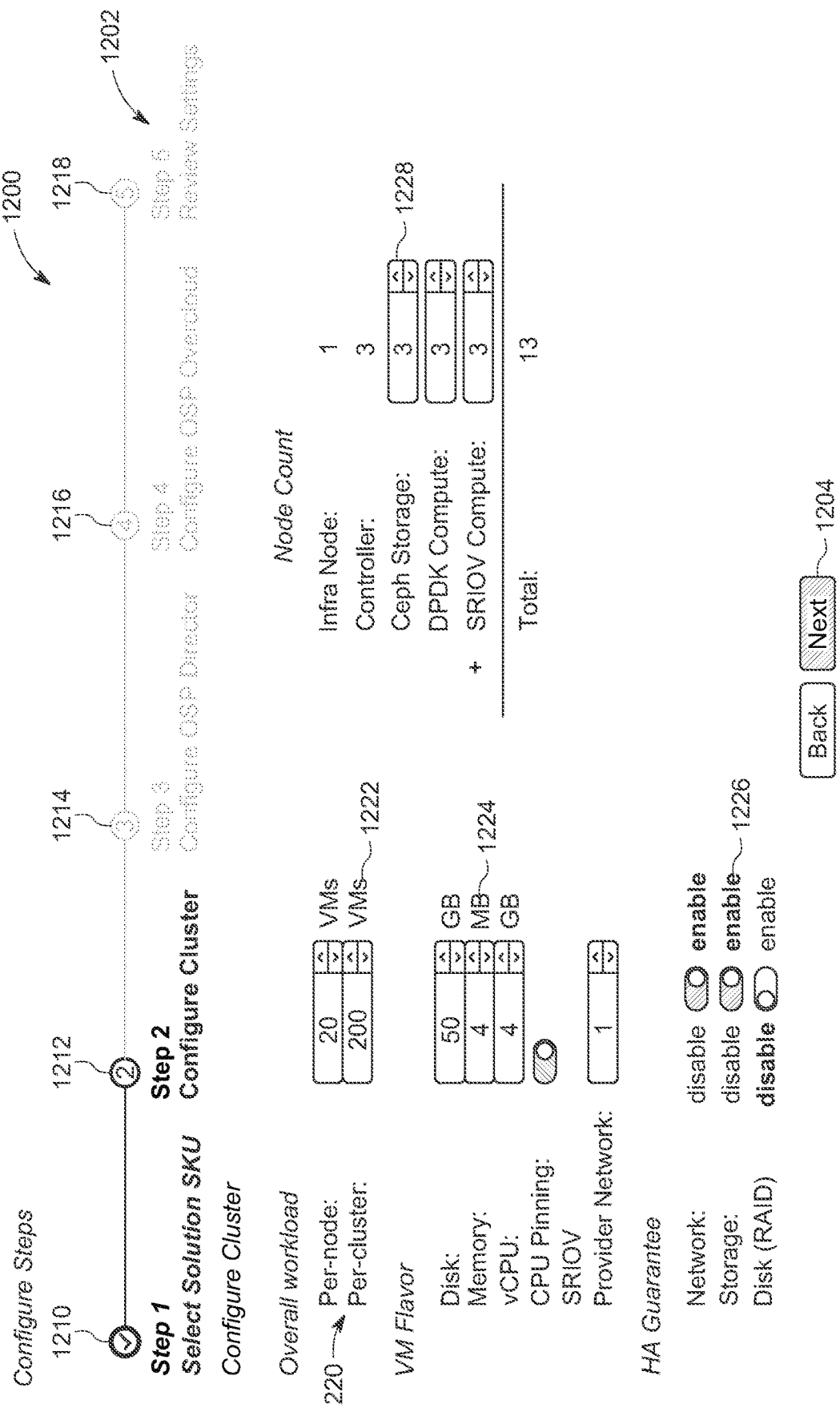

FIG. 12C shows the selection of the configure cluster interface stage 1212 that causes a configure cluster interface 1220 to be displayed that allows a user to enter expected workload requirements used by the templates generated by the process in FIGS. 9A-9B. The configure cluster interface 1220 includes overall work load selection fields 1222, VM flavor fields 1224, HA guarantee fields 1226, and a node count field 1228. The over workload selection fields 1222 allow a user to select the number of virtual machines per node and per cluster. The VM flavor fields 1224 allows a user to select the disk size; memory size; vCPU size; whether the CPUs in the cluster provide CPU pinning; and the numbers of SR-IOV provider networks, if a SR-IOV network is required. The HA guarantee fields 1226 allow a user to choose whether to enable HA features in terms of network, storage, and disks. The node count field 1228 shows the number of allocated nodes, which allows a user to set nodes for Ceph storage, DPDK and SROV functions. The node count field 1228 also lists the number of controller and director nodes.

Figure 12D:
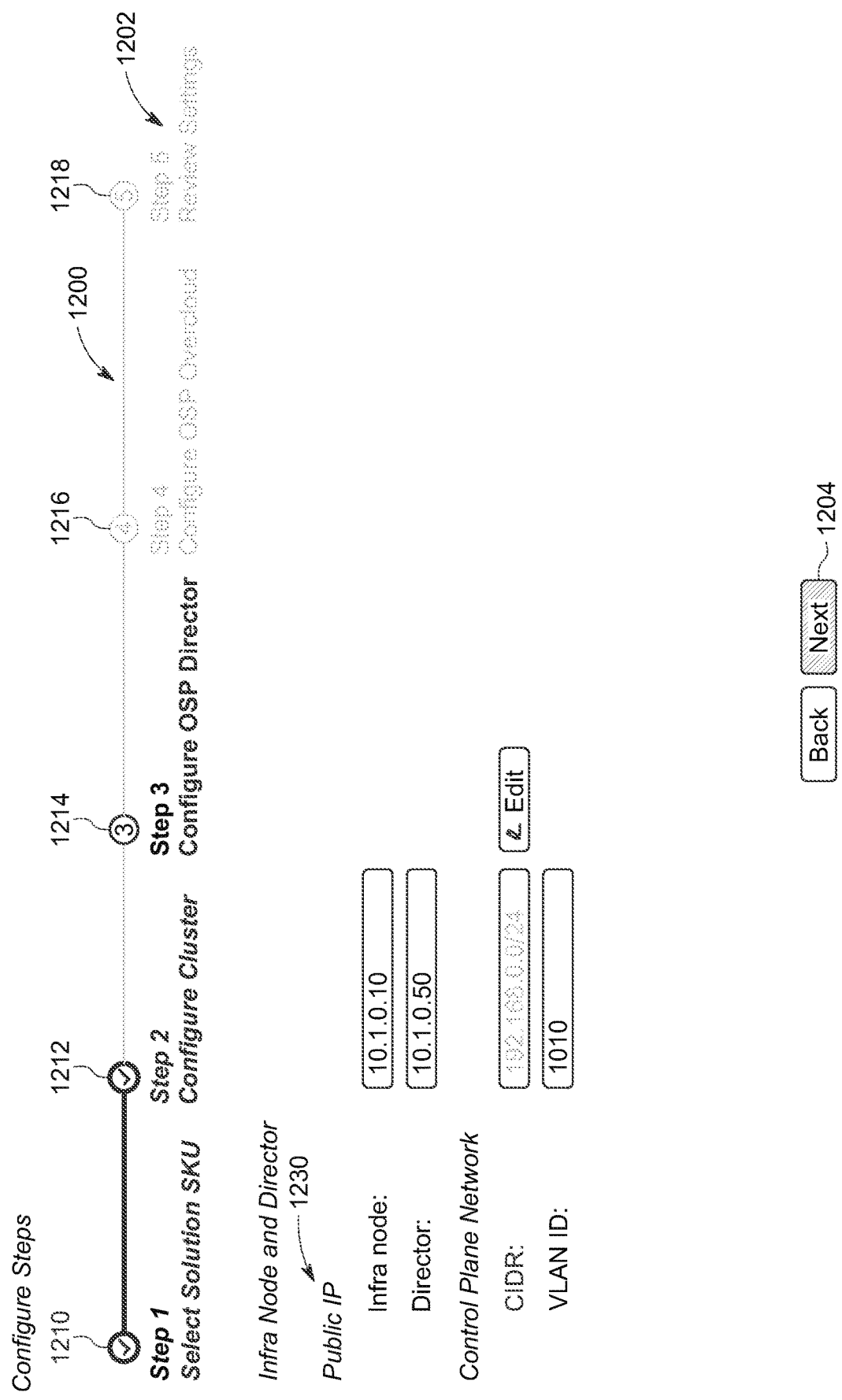

FIG. 12D shows the selection of the configure OSP Director stage 1214 that causes an OSP Director interface 1230 to be displayed. OSP is a red hat OpenStack solution and the OSP director can be regarded as its orchestration for OSP deployment. The interface 1230 allows a customer to enter the network subnet/VLAN information for the OSP undercloud, which is able to fit in their own environment.

Figure 12E:
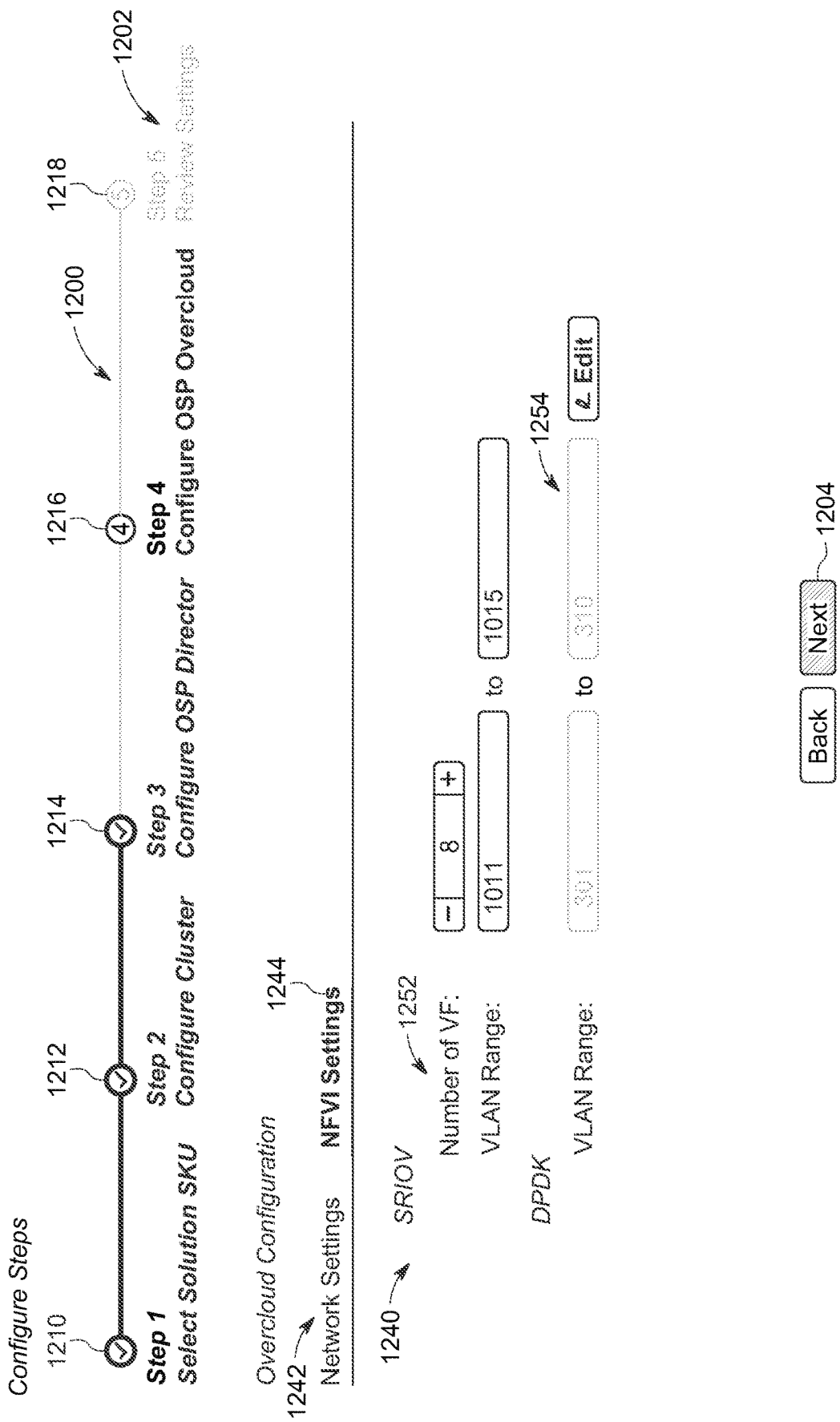
Figure 12F:
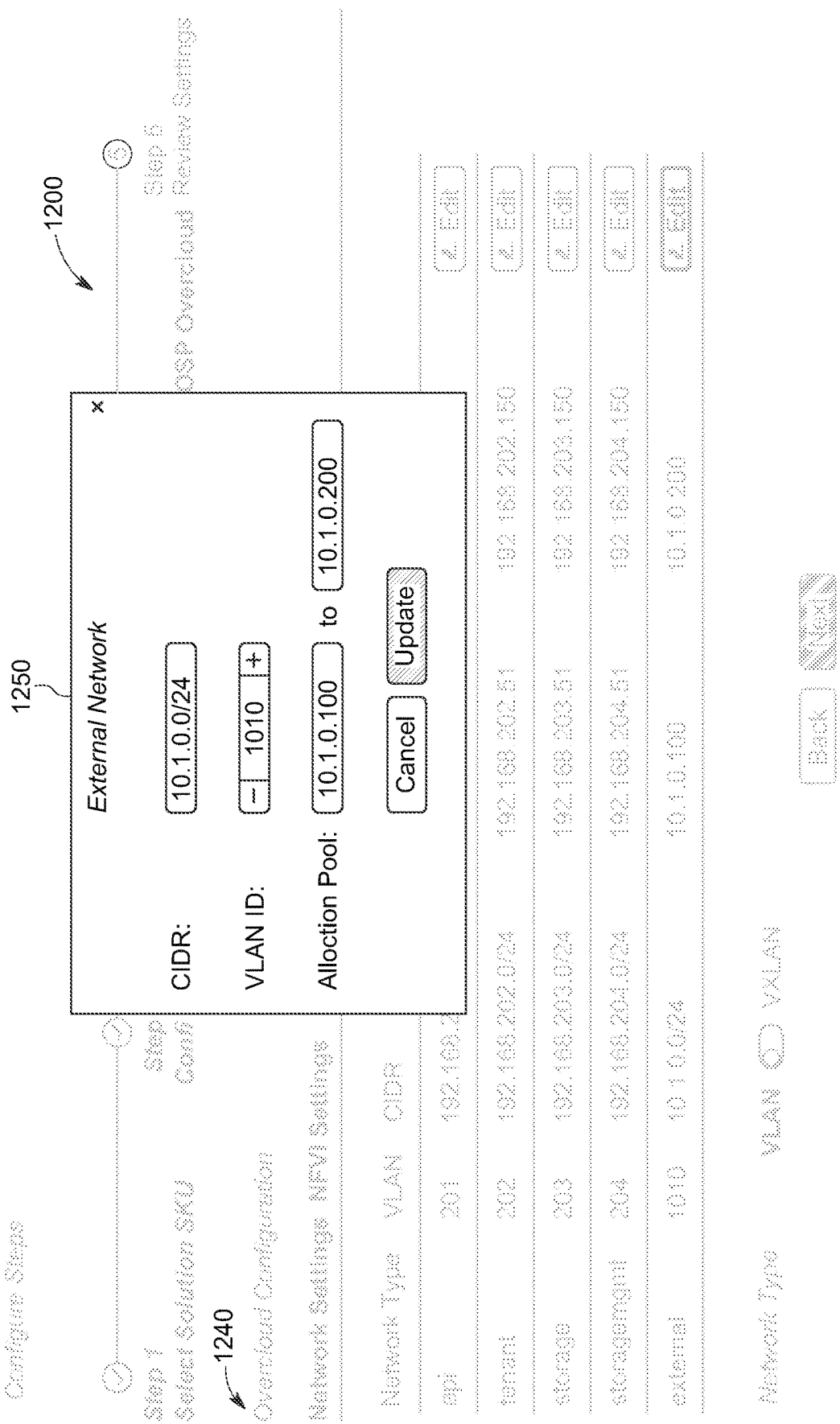

FIG. 12E shows the selection of the configure OSP Overcloud stage 1216 that causes an OSP Overcloud interface 1240 to be displayed. The OSP overcloud may be regarded as the OpenStack solution to be designed/deployed by the system. The interface 1240 includes a network settings selection 1242 and a NFVI settings selection 1244. The network settings selection 1242 allows a user to enter network subnet/VLAN information for an OpenStack solution which is able to fit in their own environment. The user may also choose whether to use VLAN or VxLAN in their environment. Once the user clicks to edit the information of a network type, a pop up window 1250 shown in FIG. 12F will open. The user can enter related information, including network CIDR, VLAN ID, and allocation pool values for the OpenStack solution. Returning to FIG. 12D, the NFVI settings selection 1244 allows a user to enter VLAN range and related settings for SR-IOV and DPDK networks, via a SR-IOV settings area 1252 and a DPDK settings area 1254.

Figure 12G:
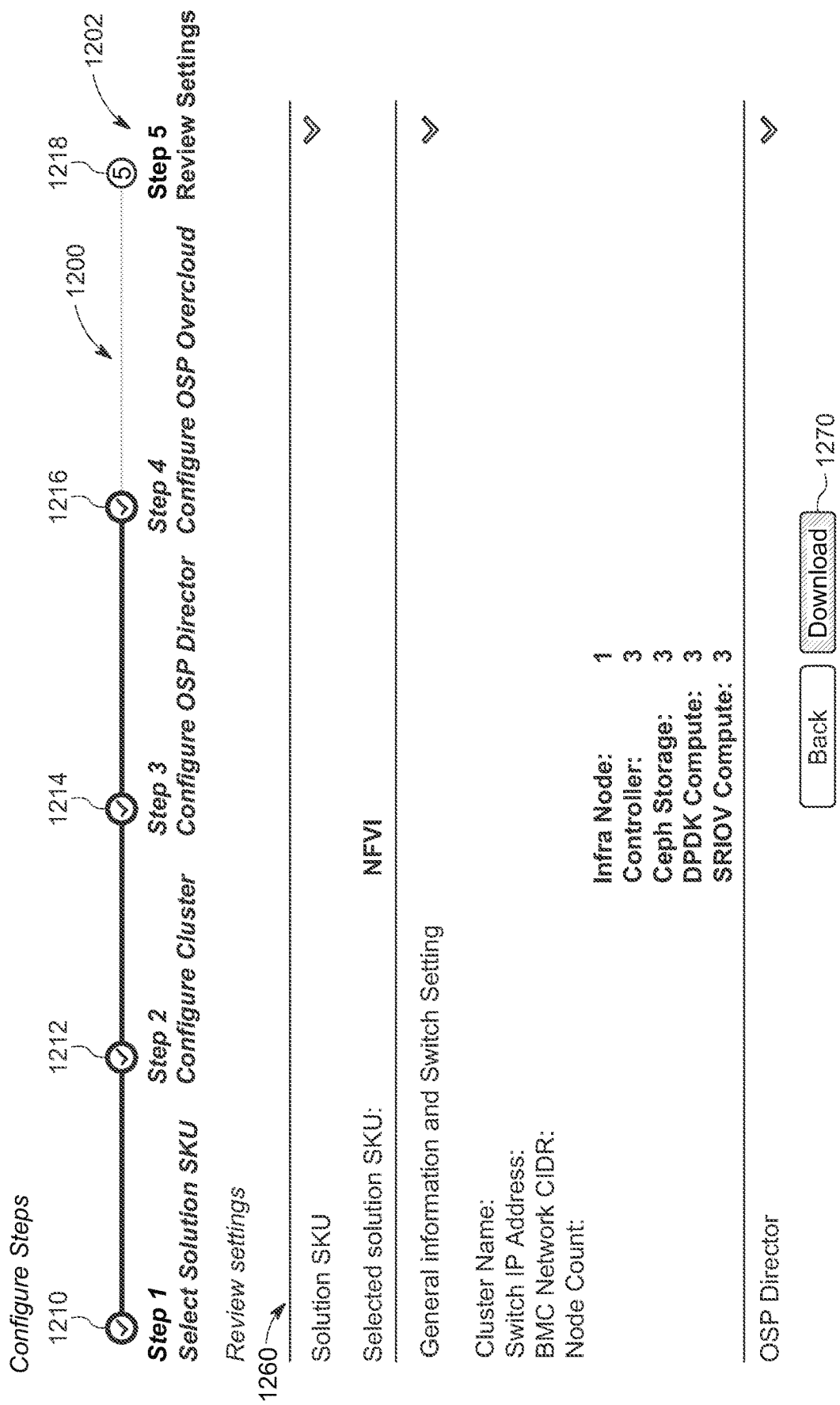
Figure 12H:
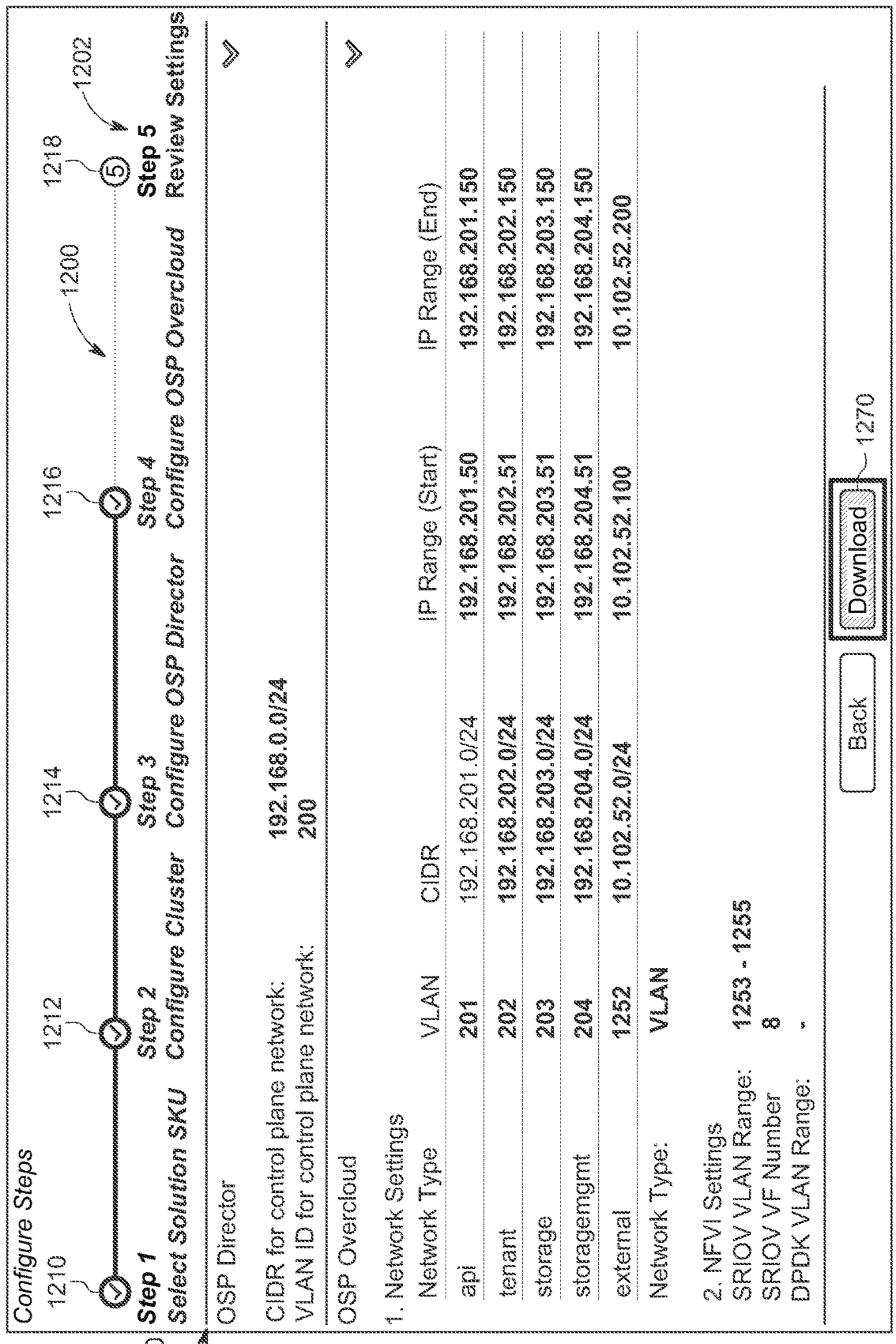

FIGS. 12G-12H show the selection of the configure review settings stage 1218 that causes a review settings interface 1260 to be displayed. The review settings interface 1260 allows a user to review and double check all of the settings entered in FIGS. 12A-12G. The review settings interface 1260 displays the SKU configurations, switch settings, configuration of the OSP director, and the OSP overcloud. The reviews settings interface 1260 include a download button 1270 that when selected, downloads the entered configurations file, which is imported to the solution deployer running on the deployment server 200 in FIG. 2.

Figure 13:
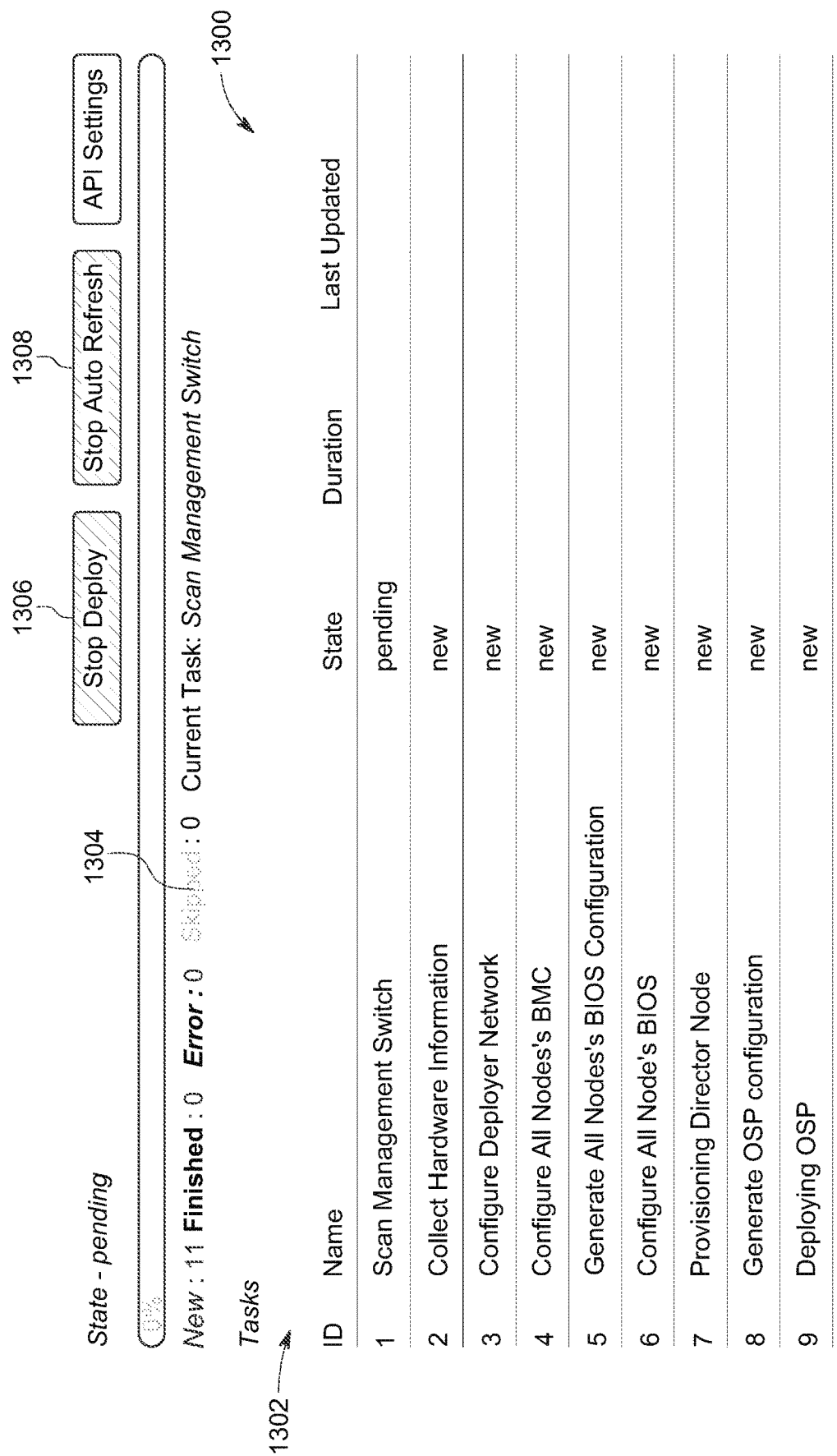
FIG. 13 is a screen image of a status user interface that shows the status of each of the steps of the process outlined in FIG. 2.

FIG. 13 is a screen image of a status user interface 1300 that shows a status table 1302 that summarizes the status of each steps in the process outlined in FIG. 2. The steps include: (1) scanning the management switch; (2) collecting hardware information; (3) configuring deployer network; (4) configuring BMCs for all nodes; (5) generating BIOS configuration for all nodes; (6) configuring BIOS for all nodes; (7) provisioning director node; (8) generating the OSP configuration; and (9) deploying the OSP. The interface 1300 includes an overall progress bar 1302 that shows a summary of the completion of the steps. The table 1302 shows the state of each task, including the state, duration, and a last updated time. The interface 1300 includes a stop deploy button 1306 that allows a user to interrupt the deployment process. The interface 1300 includes a stop auto refresh button 1308 to stop and auto refresh the interface 1300.

The flow diagrams in FIGS. 2, 6, and 9 are representative of example machine readable instructions for the deployment server 200 in FIG. 2 to provide the correct software and hardware configuration for a rack system. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], or a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIGS. 2, 6, and 9, persons of ordinary skill in the art will readily appreciate that many other methods of implementing the example machine readable instructions may alternatively be used. For example, the order of execution of the blocks may be changed, and/or some of the blocks described may be changed, eliminated, or combined.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method for configuring the basic input output system (BIOS) of nodes in a networked cluster, the method comprising:
    establishing a connection between a deployment server and each of the nodes, wherein the deployment server is operable to access a plurality of stored different options for BIOS configurations, wherein the deployment server includes BIOS configuration files;
    selecting at least one of the accessible BIOS options for at least one BIOS configuration for each of the nodes via an intelligent engine based on a predefined rule, wherein the corresponding BIOS options include a memory on the node, a removable memory device, and a network storage device;
    configuring the BIOS for each of the nodes according to the selected BIOS option;
    generating an interface on a display, the interface including the plurality of options in the order, and an input mechanism to select one of the plurality of options, wherein the interface includes a selection input to allow a user to select a BIOS configuration for at least one of the nodes, and wherein the predefined rules follow the selected BIOS configuration, and wherein the BIOS configuration is a boot up source;
    based on the selection input, searching the BIOS configuration files for a matching file to the selection input via the deployment server; and
    selecting one of the plurality of options based on a preselected order of accessible BIOS options for the BIOS configuration via the predetermined rules, if a match between the selection input and BIOS configuration files is not found.

2. The method of claim 1, wherein the selection input includes at least one of a menu, an item, a subitem, or a value.

3. The method of claim 1, wherein the interface includes a selection input to allow a user to select a BIOS configuration for a group of nodes, a single node, or every node.

4. The method of claim 1, further comprising comparing the selected BIOS option with an existing BIOS option of each of the nodes, and leaving the existing BIOS option if the selected BIOS option is the same as the existing BIOS option.

5. The method of claim 1, wherein each of the BIOS configurations includes a BIOS boot specification order for a plurality of hard drives and a BIOS boot specification order for a plurality of network devices.

6. A system to automatically configure the basic input output system (BIOS) of nodes in a networked cluster, the system comprising:
    a deployment hardware server connected via the network to each of the nodes in the cluster;
    a BIOS configuration file including a plurality of stored accessible options for BIOS configurations, wherein each of the BIOS configurations includes a BIOS boot specification order for a plurality of hard drives and a BIOS boot specification order for a plurality of network devices;
    an intelligent engine operable to:
        select at least one of the accessible BIOS options for at least one BIOS configuration for each of the nodes via an intelligent engine based on a predefined rule, wherein the corresponding BIOS options include a memory on the node, a removable memory device, and a network storage device; and
        configure the BIOS for each of the nodes according to the selected BIOS configuration option; and
    a display coupled to the deployment server, wherein the deployment server generates an interface on the display, the interface including the plurality of options in the order, and an input mechanism to select one of the plurality of options, wherein the interface includes a selection input to allow a user to select a BIOS configuration for at least one of the nodes;
    wherein the BIOS configuration is a boot up source;
    wherein the predefined rules follow the selected BIOS configuration;
    wherein based on the selection input, the deployment server searches the BIOS configuration files for a matching file to the selection input; and
    wherein the predetermined rules select one of the plurality of options based on a preselected order of accessible BIOS options for the BIOS configuration, if a match between the selection input and BIOS configuration files is not found.

7. The system of claim 6, wherein the selection input includes at least one of a menu, an item, a subitem, or a value.

8. The system of claim 6, wherein the interface includes a selection input to allow a user to select a BIOS configuration for a group of nodes, a single node, or every node.

9. The system of claim 6, wherein the intelligent engine is operable to compare the selected BIOS option with an existing BIOS option of each of the nodes, and leaves the existing BIOS option if the selected BIOS option is the same as the existing BIOS option.

10. A system to automatically configure the basic input output system (BIOS) of nodes in a networked cluster, the system comprising:
    a deployment hardware server connected via the network to each of the nodes in the cluster;
    a BIOS configuration file including a plurality of stored accessible options for BIOS configurations;
    an intelligent engine operable to:
        select at least one of the accessible BIOS options for at least one BIOS configuration for each of the nodes based on a predefined rule; and
        configure the BIOS for each of the nodes according to the selected BIOS option, wherein the BIOS configuration is a boot up source, and wherein the corresponding BIOS options include a memory on the node, a removable memory device, and a network storage device; and a display coupled to the deployment server, wherein the deployment server generates an interface on the display, the interface including the plurality of options in the order, and an input mechanism to select one of the plurality of options, wherein the interface includes a selection input to allow a user to select a BIOS configuration for at least one of the nodes, and wherein the predefined rules follow the selected BIOS configuration, and wherein based on the selection input, the deployment server searches the BIOS configuration files for a matching file to the selection input; and wherein the predetermined rules select one of the plurality of options based on a preselected order of accessible BIOS options for the BIOS configuration, if a match between the selection input and BIOS configuration file is not found.

* * * * *